(12) United States Patent
Joo et al.

(10) Patent No.: US 10,578,310 B2
(45) Date of Patent: Mar. 3, 2020

(54) COOKING APPARATUS AND METHOD OF CONTROLLING THE SAME

(71) Applicant: Samsung Electronics Co., Ltd., Suwon-si (KR)

(72) Inventors: Young Woong Joo, Suwon-si (KR); Bon Ju Koo, Hwaseong-si (KR); Hee Cheol Kim, Hwaseong-si (KR); Myoung Jin Ham, Suwon-si (KR); Hong-Joo Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 118 days.

(21) Appl. No.: 15/693,932

(22) Filed: Sep. 1, 2017

(65) Prior Publication Data

US 2018/0084937 A1 Mar. 29, 2018

(30) Foreign Application Priority Data

Sep. 1, 2016 (KR) .................. 10-2016-0112789

(51) Int. Cl.
*F24C 7/08* (2006.01)
*A23L 5/10* (2016.01)
(Continued)

(52) U.S. Cl.
CPC .............. *F24C 7/086* (2013.01); *A23L 5/10* (2016.08); *A47J 27/002* (2013.01); *A47J 36/00* (2013.01);
(Continued)

(58) Field of Classification Search
CPC .......... A47J 36/32; A47J 36/00; A47J 27/002; A47J 37/0664; A47J 37/0623;
(Continued)

(56) References Cited

U.S. PATENT DOCUMENTS 3,711,672 A * 1/1973 Moreland, II .......... F24C 7/083
 219/625
4,111,358 A * 9/1978 Semple .................... F24C 7/08
 219/398
(Continued)

FOREIGN PATENT DOCUMENTS

CA 2960472 3/2016
CN 101741367 6/2010
(Continued)

OTHER PUBLICATIONS

European Communication under Rule 71(3) dated Jul. 23, 2018 in European Patent Application No. 17189122.9.
(Continued)

*Primary Examiner* — Drew E Becker
(74) *Attorney, Agent, or Firm* — Staas & Halsey LLP

(57) ABSTRACT

A cooking apparatus includes a body, an input unit configured to receive a command in relation to controlling the cooking apparatus from a user, a knob configured to be attachable to one surface of the body or detachable from the body, and a controller configured to sense whether the knob is attached to the body, to receive the command via the knob when the knob is attached, and to receive the command from the input unit when the knob is not attached. As is apparent from the above description, the cooking apparatus may be controlled according to a user's preferences by using the knob attachable to and detachable from the body of the cooking apparatus and may be more conveniently controlled by using the knob in several sides of the cooking apparatus rather than a limited space.

17 Claims, 26 Drawing Sheets

(51) Int. Cl.
*A47J 37/06* (2006.01)
*F24C 3/12* (2006.01)
*H05B 1/02* (2006.01)
*A47J 27/00* (2006.01)
*A47J 36/00* (2006.01)

(52) U.S. Cl.
CPC ....... *A47J 37/0623* (2013.01); *A47J 37/0664* (2013.01); *F24C 3/124* (2013.01); *F24C 7/082* (2013.01); *F24C 7/088* (2013.01); *H05B 1/0261* (2013.01)

(58) Field of Classification Search
CPC .............. F24C 3/12–3/128; F24C 5/16; F24C 7/08–7/088; H05B 1/0258–1/0266; A23L 5/10
USPC .................. 426/231–233, 523; 99/325–337
See application file for complete search history.

(56) References Cited

U.S. PATENT DOCUMENTS

| | | | | |
|---|---|---|---|---|
| 4,158,216 | A | 6/1979 | Bigelow | |
| 4,233,593 | A | 11/1980 | Bigelow | |
| 4,983,812 | A * | 1/1991 | Worrall | H01H 36/0066 219/445.1 |
| 5,920,131 | A * | 7/1999 | Platt | F24C 7/082 307/104 |
| 6,498,326 | B1 * | 12/2002 | Knappe | H05B 3/746 219/507 |
| 6,713,730 | B1 * | 3/2004 | Zakerin | F24C 15/106 219/492 |
| 6,998,585 | B2 * | 2/2006 | Erdmann | F24C 7/083 219/443.1 |
| 8,835,814 | B2 * | 9/2014 | Apetauer | F24C 7/083 219/443.1 |
| 2001/0008237 | A1 * | 7/2001 | Essig | F24C 7/083 219/482 |
| 2005/0189820 | A1 * | 9/2005 | Blumenthal | F24C 7/083 307/104 |
| 2011/0031096 | A1 | 2/2011 | Baier | |
| 2014/0042004 | A1 | 2/2014 | Tseng | |
| 2016/0003484 | A1 * | 1/2016 | Span | F24C 7/083 426/231 |
| 2017/0303346 | A1 * | 10/2017 | Kang | G06F 3/041 |
| 2018/0299135 | A1 * | 10/2018 | Bach | G05G 25/04 |
| 2018/0301301 | A1 * | 10/2018 | Bach | H03K 17/941 |
| 2019/0109592 | A1 * | 4/2019 | Lyszus | H03K 17/968 |

FOREIGN PATENT DOCUMENTS

| | | | | |
|---|---|---|---|---|
| EP | 2258988 | | 12/2010 | |
| JP | 2012-241928 | | 12/2012 | |
| KR | 1994-0000426 | | 1/1994 | |
| KR | 10-2001-0030129 | | 4/2001 | |
| KR | 10-0617106 | | 9/2006 | |
| KR | 10-2014-0069536 | | 6/2014 | |
| KR | 10-2015-0128172 | | 11/2015 | |
| KR | 10-2016-0028909 | | 3/2016 | |
| KR | 10-2016-0064543 | | 6/2016 | |
| WO | WO-2016035998 | A1 * | 3/2016 | ............. G06F 3/041 |

OTHER PUBLICATIONS

International Search Report dated Dec. 15, 2017 in International Patent Application No. PCT/KR2017/009602.
Extended European Search Report dated Feb. 2, 2018 in European Patent Application No. 17189122.9.

* cited by examiner

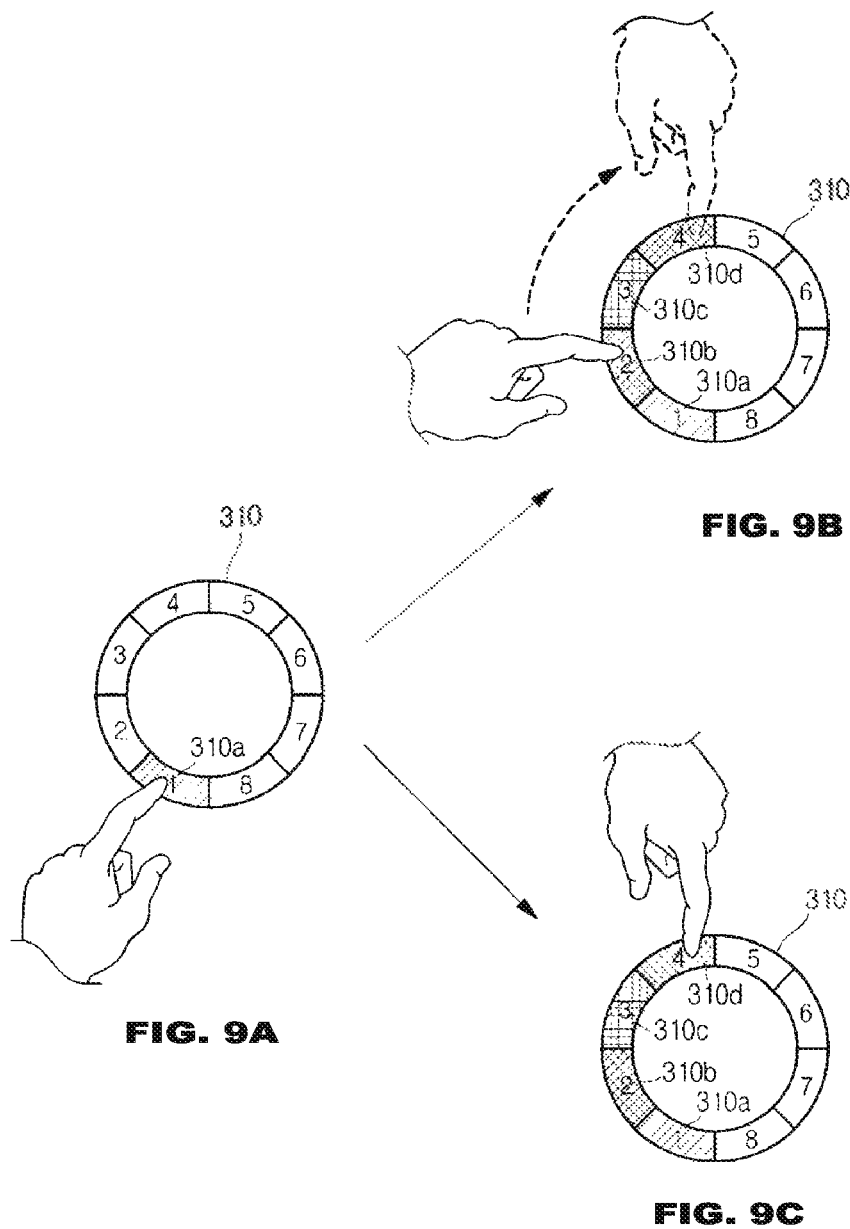
<METHOD OF ADJUSTING TEMPERATURE WHEN KNOB IS DETACHED>

CASE IN WHICH KNOB IS PRESENT

CASE IN WHICH KNOB IS REMOVED

CASE IN WHICH THERE IS NO KNOB

CASE IN WHICH THERE IS NO KNOB

CASE IN WHICH THERE IS NO KNOB

CASE IN WHICH KNOB IS PRESENT

COOKING APPARATUS AND METHOD OF CONTROLLING THE SAME

CROSS-REFERENCE TO RELATED APPLICATIONS

This application claims the benefit of Korean Patent Application No. 10-2016-0112789, filed on Sep. 1, 2016 in the Korean Intellectual Property Office, the disclosure of which is incorporated herein by reference.

BACKGROUND

1. Field

Embodiments of the present disclosure relate to a cooking apparatus and a method of controlling the same, and more particularly, to a technology of controlling a cooking apparatus using a detachable knob on one surface of a body.

2. Description of the Related Art

Cooking apparatuses are apparatuses configured to cook an ingredient by heating the ingredient and may be classified into a gas oven configured to heat an ingredient by burning gas, an electric oven configured to heat an ingredient by converting electric energy into heat energy, a microwave oven configured to heat an ingredient by emitting microwaves toward the ingredient, a gas stove configured to heat a container in which an ingredient is accommodated by burning gas, and an induction apparatus configured to heat a container in which an ingredient is accommodated by generating a magnetic field.

When a cooking apparatus is configured as an induction heating apparatus, a harmful gas is not emitted and a cooking counter is clean while cooking food. Also, since electric power is used as an energy source, controlling is easy and safe which is advantageous. Also, various functions for cooking food may be supported and energy efficiency is higher than that of a cooking apparatus using a gas burner.

In a cooking apparatus using a general gas burner, a fire is made at a fuel intake using a dialing type handle, that is, a knob and intensity of fire is adjusted. In a cooking apparatus using an induction heating apparatus, an analog button with a covered top to maintain an integrated body or a touch type controlled by a touch of a user is used.

However, the above-described limited input method do not satisfy various users' desires with respect to a design and operation method of a cooking apparatus and there is a limitation of being unfamiliar to users who are familiar with using of a dialing type handle, that is, a knob.

SUMMARY

Therefore, it is an aspect of the present disclosure to provide a cooking apparatus capable of allowing a user to control the cooking apparatus according to his or her preferences using a detachable knob and a method of controlling the cooking apparatus.

Additional aspects of the present disclosure will be set forth in part in the description which follows and, in part, will be obvious from the description, or may be learned by practice of the present disclosure.

In accordance with one aspect of the present disclosure, a cooking apparatus includes a body, an input unit configured to receive a command for controlling the cooking apparatus from a user, a knob configured to be attachable or detachable to one surface of the body and a controller configured to determine whether the knob is attached to the body, to receive the command from the knob when the knob is determined to be attached to the body and to receive the command from the input unit when the knob is determined not to be attached to the body.

The cooking apparatus may further include a display configured to display information of the cooking apparatus.

The knob may be attachable to or detachable from at least one of the input unit and the display.

The controller may control at least one of screens of the input unit and the display depending on whether the knob is determined to be attached to the display.

The cooking apparatus may further include at least one heating portion configured to produce heat.

The command may include at least one of a temperature and a heating time of the heating portion.

The controller may control the temperature and heating time of the heating portion input by the user not to be changed even whether the knob is determined to be attached or detached.

The controller may control the input unit to allow the user to sequentially change or to directly input and change the temperature and heating time of the heating portion when the knob is determined to be detached to the body.

The controller may sense rotation of the knob and may relatively change the temperature and heating time of the heating portion by a rotational amount of the knob.

The knob may further include a first magnetic body, and the body may further include a second magnetic body.

The knob and the body may be attached to each other through a magnetic attraction between the first magnetic body and the second magnetic body.

The knob may further include a protrusion configured to protrude toward the body, and the protrusion may include a conductive material.

The input unit may include a plurality of touch sensors arranged in a circular shape.

The controller may sense whether the knob is attached, depending on the number of the touch sensors touched by the protrusion.

The knob may further include a selector configured to select the at least one heating portion to be controlled.

The knob may further include an indicator configured to indicate the selected at least one heating portion.

The display may further include a touch film and a display panel.

The knob may further include a protrusion configured to protrude toward the body.

The protrusion may include a conductive material.

The controller may determines whether the knob is attached to the body, based on a number of the plurality of touch sensors sensing protrusion.

The knob may further include a first magnetic body, and the display panel may further include a second magnetic body.

The knob and the panel may be attached to each other through attraction between the first magnetic body and the second magnetic body.

In accordance with another aspect, a method of controlling a cooking apparatus includes determining whether a knob configured to be attachable to or detachable from one surface of a body of the cooking apparatus is attached to the body; and controlling to receive a command for the cooking apparatus from the knob when the knob is determined to be attached to the body and to receive the command from an input unit when the knob is determined not to be attached to the body.

The cooking apparatus further comprise a display,

The knob may be attachable to or detachable from at least one of the input unit and the display.

The controlling may include controlling at least one of screens of the display and the input unit depending on whether the knob is determined to be attached to the display.

The command may include at least one of a heating temperature and a heating time for the cooking apparatus.

BRIEF DESCRIPTION OF THE DRAWINGS

These and/or other aspects of the present disclosure will become apparent and more readily appreciated from the following description of the embodiments, taken in conjunction with the accompanying drawings of which:

FIGS. 9A to 9C are views illustrating a method of controlling the cooking apparatus when the knob is not attached, according to one embodiment;

DETAILED DESCRIPTION

Figure 1:
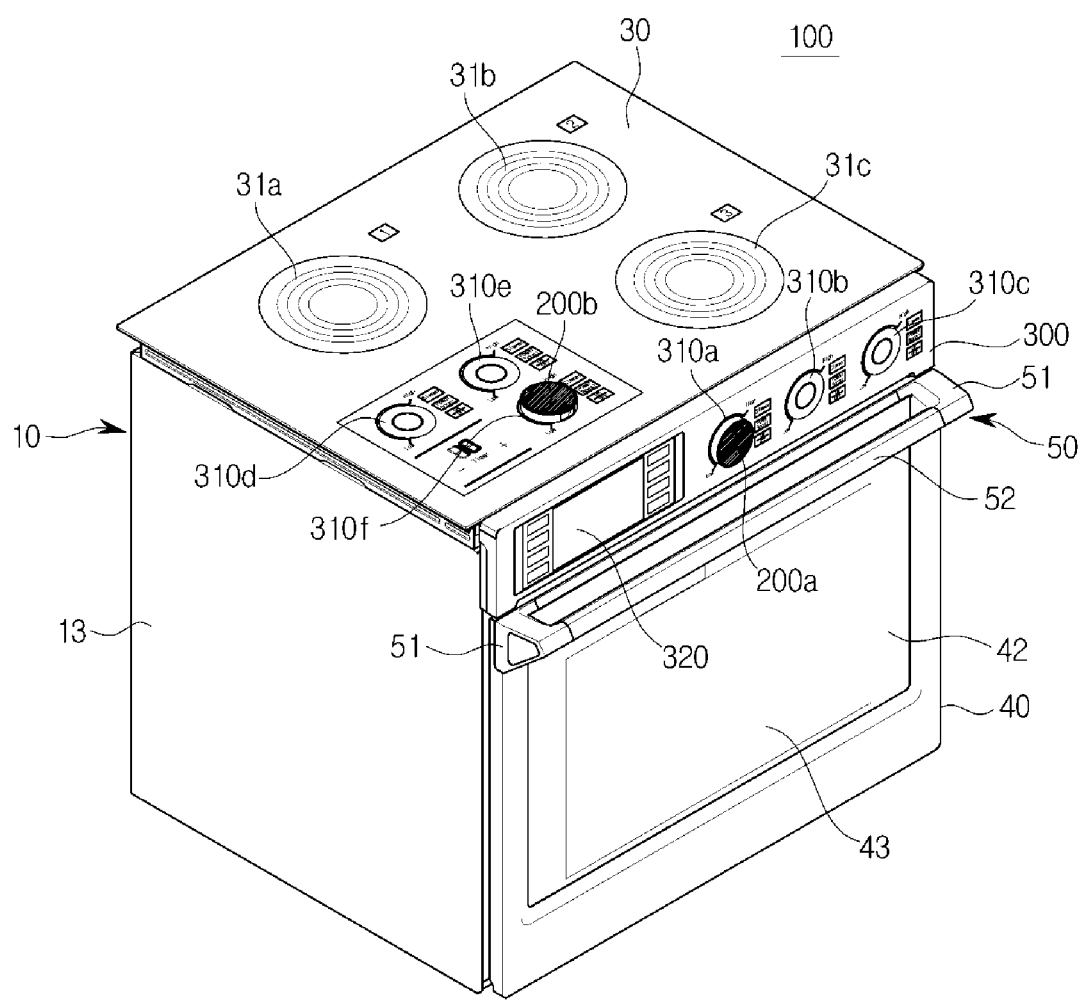
FIG. 1 is an external view illustrating an external shape of a cooking apparatus according to one embodiment.

Embodiments disclosed herein and components shown in the drawings are merely preferable examples and various modifications capable of replacing the embodiments and drawings may be made at the time of filing the present application.

Also, the terms used herein are to explain the embodiments but are not intended to limit and/or define the present disclosure. Singular forms, unless defined otherwise in context, include plural forms.

Throughout the specification, the terms "comprise", "include", "have" or the like are used herein to specify the presence of stated features, numbers, steps, operations, elements, components or combinations thereof but do not preclude the presence or addition of one or more other features, numbers, steps, operations, elements, components, or combinations thereof.

Also, even though the terms including ordinals such as first, second and the like may be used for describing various components, the components will not be limited by the terms and the terms are used only for distinguishing one component from others. For example, without departing from the scope of the present invention, a first component may be referred to as a second component, and likewise, the second component may be referred to as the first component. The term "and/or" includes any and all combinations or one of a plurality of associated listed items.

Hereafter, embodiments will be described in detail with reference to the attached drawings to allow one of ordinary skill in the art to easily implement. Also, throughout the drawings, irrelevant parts will be omitted to definitely describe the present disclosure.

Also, an apparatus to which a knob 200 is attached will be described on the basis of a cooking apparatus 100 but is not limited thereto and a principle of the present disclosure may be applied to other electronic apparatuses to be used.

That is, the principle of the present disclosure may be applied to a mobile terminal such as a smart phone and may be applied to other home appliances such as a television panel and display panels of an air conditioner and a washing machine.

Hereinafter, the embodiments will be described in detail with reference to the attached drawings.

Figure 2:
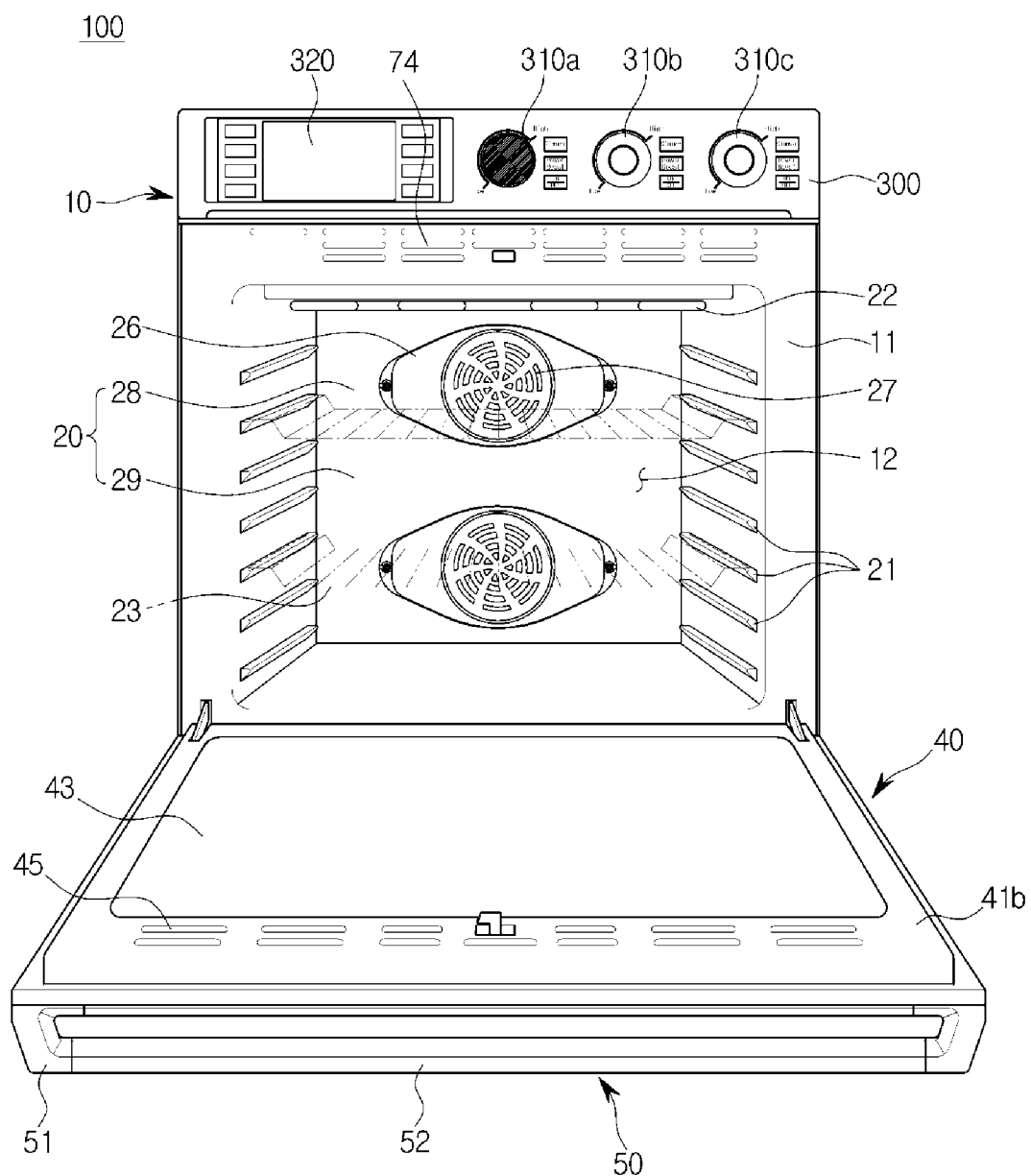
FIG. 2 is a view illustrating an internal shape of the cooking apparatus according to one embodiment.

FIG. 1 is a perspective view of a cooking apparatus according to one embodiment. FIG. 2 is a view illustrating a state in which a door of the cooking apparatus according to one embodiment is opened.

A front surface and a front used hereafter refer to directions that face a front surface and a front viewed in front of the cooking apparatus 100 and a rear refers to a direction that faces a rear of the cooking apparatus 100.

As shown in FIGS. 1 and 2, the cooking apparatus 100 may include a body 10 that forms an external shape, a cooking chamber 20 positioned inside the body 10, and a cooktop 30 provided at a top end of the cooking apparatus 100 and configured to heat a container thereon in which an ingredient is accommodated.

The cooktop 30 may include at least a plurality of cooktops 31a, 31b, and 31c.

The cooktop 30 may include a heating source formed of a plurality of times-wound coil to heat a container in which an ingredient is accommodated. However, the heating source is not limited to a heating coil that is a heating body using electricity but may be provided as a gas burner or an oil burner.

That is, the cooking apparatus 100 according to one embodiment may include an induction heating burner, a heating coil, a gas burner, and an oil burner as a heating source.

The body 10 may include a front panel 11 that forms a front surface of the body 10 and a side panel 13 that forms a side of the body 10.

The cooking chamber 20 may be provided in a box shape inside the body 10 and may have an open front surface to withdraw or insert an ingredient. The front panel 11 may include an opening 12 provided corresponding to the cooking chamber 20 having the open front surface. The open front surface of the cooking chamber 20 may be opened and closed by a door 40.

The cooking chamber 20, as shown in FIG. 2, may include a first cooking chamber 28 and a second cooking chamber 29, the number of the cooking chambers 20 is not limited thereto, and at least one cooking chamber may be provided.

The cooking chamber 20 may include a plurality of supports 21 therein. A rack 23 for putting an ingredient thereon may be mounted on the plurality of supports 21. The plurality of supports 21 may be provided to protrude from a left wall and a right wall of the cooking chamber 20.

A divider (not shown) capable of dividing the cooking chamber 20 may be separably mounted on the plurality of supports 21. In detail, the divider may be horizontally mounted in the cooking chamber 20 and may divide the cooking chamber 20 into a plurality of cooking chambers.

A plurality of such cooking chambers 20 may not have the same size and may have different sizes. The divider may insulate each of the cooking chambers 20 using an insulation material. Through this, spaces of the cooking chambers 20 may be variously utilized depending on a user's intention.

The cooking chamber 20 may include a heater 26 that heats an ingredient. In the embodiment, the heater 26 may be an electric heater including an electric resistor. However, unlike the embodiment, the heater 26 may be a gas heater that generates heat by burning gas. That is, the cooking apparatus 100 according to one embodiment may include an electric oven and a gas oven as a heating source.

The door 40 may be hinge-coupled with a bottom of the body 10 to be rotatable with respect to the body 10. Unlike this, although not shown in the drawing, the door 40 may be hinge-coupled with a left side or a right side of the body 10.

A plurality of glass members may be provided inside the door 40. This is to allow an inside of the cooking chamber 20 to be visible through a transparent portion 42. The transparent portion 42 may be provided as a transparent member in addition to the plurality of the glass members 43.

A door suction hole capable of suctioning air into the door 40 may be provided at a bottom end of the door 40. Outdoor air suctioned in through the bottom end of the door 40 may move toward a top of the door 40, may be heat-exchanged with heat transferred from the cooking chamber 20, and then may be discharged through a door discharge hole 45 provided at a rear door frame 41b positioned in the rear of the door 40. Through this configuration, heat inside the door 40 may be cooled through air circulation in the embodiment.

A handle 50 which a user can grip may be provided at a top end of the front surface of the door 40 for easily opening and closing the door 40. On the other hand, when the door 40 is hinge-coupled with the left side or the right side of the body 10, the handle 50 may be provided on a right side or a left side of the front surface of the door 40 corresponding thereto.

The handle 50 may protrude frontward from the front surface of the door 40 by a preset length. That is, the handle 50 may include a pair of handle supports 51 that extend frontward from the front surface of the door 40 and a handle extender 52 that connects the pair of handle supports 51.

An interface 300 that includes an input unit 310 for inputting various pieces of information with respect to controlling the cooking apparatus 100 and a display 320 that displays various pieces of information of the cooking apparatus 100 may be disposed above the front panel 11.

The interface 300 may be provided not only above the front panel 11 as shown in FIG. 1 but also on the cooktop 30 of the body 10 and is not limited thereto and may be provided on any one side of the body 10.

The input unit 310 may directly receive a particular command through a touch of a user or through the knob 200.

Figure 3:
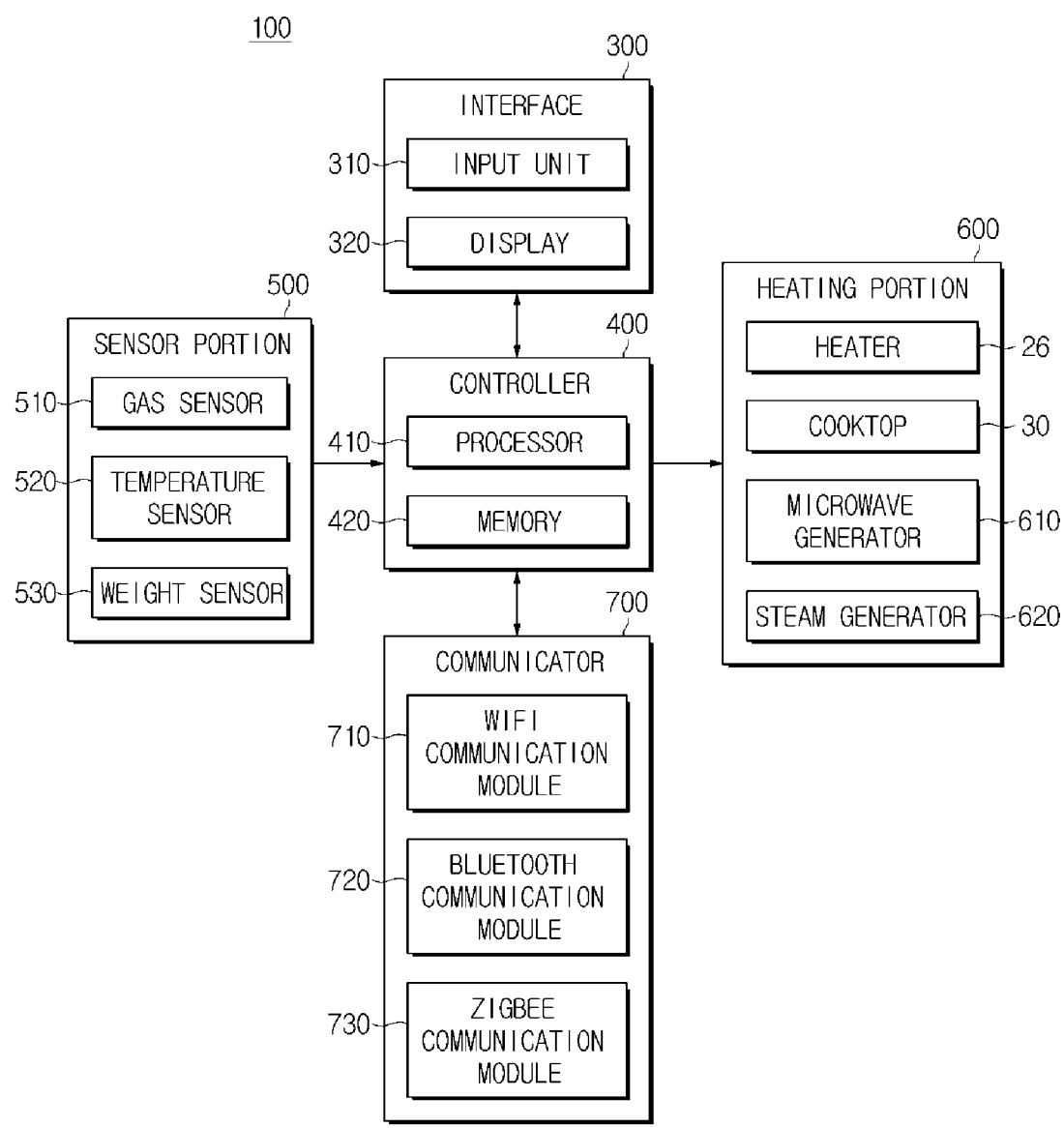
FIG. 3 is a block diagram illustrating components of the cooking apparatus according to one embodiment.

FIG. 3 is a block diagram illustrating components of the cooking apparatus according to one embodiment.

Referring to FIG. 3, the cooking apparatus 100 may include interface 300 configured to interact with a user, a sensor portion 500 configured to collect information of the cooking chamber and an ingredient, a heating portion 600 configured to heat an ingredient, a communicator 700 configured to communicate with various electronic devices, and a controller 400 configured to control an operation of the cooking apparatus 100.

The user interface 300 may include the input unit 310 and the display 320.

The input unit 310 may receive various setting values in relation to cooking and a control command with respect to the cooking apparatus 100 from a user and may output electric signals corresponding to the setting values and control command input from the user to the controller 400.

For example, a plurality of operation buttons configured to receive the control command with respect to the cooking apparatus 100 and a dial configured to receive settings for a cooking operation from a user may be included.

The cooking apparatus 100 may receive a cooking mode input through the operation buttons and may receive a cooking time, a cooking temperature and the like through the dial. The above-described operation buttons may be push buttons, membrane switches, a touch pad or the like.

The display 320 may display operation information of the cooking apparatus 100 as a visual image to the user according to the control signal of the controller 400.

For example, before the cooking operation, the cooking apparatus 100 may display the cooking mode set by the user and the cooking temperature, the cooking time and the like input by the user through the display 320.

Also, during the cooking operation, the cooking apparatus 100 may display a currently-performed cooking mode, an expected residual cooking time to a completion of cooking and the like through the display 320.

The above-described display 320 may be a light emitting diode (LED) panel, a liquid crystal display (LCD) panel, an organic LED (OLED) panel and the like.

Also, the user interface 300 may include a touch screen in which an input means and a display means are integrated.

A touch screen panel displays setting values or control commands selectable by the user through a display. When the user selects and touches any one of the setting values or control commands displayed on the touch panel, the touch screen panel may detect coordinates of a touch of the user through a touch panel and may recognize a setting value or a control command input by the user by comparing detected coordinates of the touch to coordinates where the setting value or control command is displayed.

The sensor portion 500 may include a gas sensor 510 configured to detect a gas inside a cooking chamber (not shown) that accommodates an ingredient, a temperature sensor 520 configured to detect a temperature inside the cooking chamber, and a weight sensor 530 configured to detect a weight of the ingredient accommodated in the cooking chamber.

The gas sensor 510 detects a type and concentration of a gas which is generated from an ingredient and flows inside the cooking chamber.

The above-described gas sensor 510 may include a semiconductor gas sensor that determines a gas type and a gas concentration using a change in electrical conductivity which is caused by gas particles that come into contact with a surface thereof, a quartz crystal microbalance (QCM) that determines a type and concentration of gas using a piezoelectric effect, and the like.

The heating portion 600 may include the heater 26 configured to heat an inside of the cooking chamber by burning a gas, the cooktop 30 configured to heat an ingredient by converting electrical energy into heat energy, a microwave generator 610 configured to emit microwaves in the cooking chamber, and a steam generator 620 configured to emit heated steam in the cooking chamber.

However, the heating portion 600 may not include all the heater 26, cooktop 30, microwave generator 610, and steam generator 620. The heating portion 600 may include at least one of the heater 26, the cooktop 30, the microwave generator 610, and the steam generator 620 depending on a type of the cooking apparatus 100.

For example, the heating portion 600 may include the heater 26 when the cooking apparatus 100 is a gas oven, may include the microwave generator 610 when the cooking apparatus 100 is a microwave oven, and may include the steam generator 620 when the cooking apparatus 100 is a steam oven.

The communicator 700 may include communication modules 710, 720, and 730 configured to communicate with an external electronic apparatus using various communication protocols.

For example, the communicator 700 may include a wireless fidelity (WiFi) communication module 710 connected to a local area network (LAN), a Bluetooth communication module 720 configured to communicate with external apparatuses through one-to-one or several-to-one communication, and a Zigbee communication module 730 generally used in a home network and the like.

However, the communicator 700 may not include all the WiFi communication module 710, the Bluetooth communication module 720, and the Zigbee communication module 730 and may include at least one of the the WiFi communication module 710, the Bluetooth communication module 720, and the Zigbee communication module 730 as necessary.

The controller 400 may include a memory 420 configured to store a program and data for controlling the cooking apparatus 100 and a processor 410 configured to process the data according to the program stored in the memory 420.

The memory 420 may store a control program and control data for controlling the cooking apparatus 100 or may store setting values and control commands input through the interface 300, a temperature inside the cooking chamber and a type and concentration of gas detected by the sensor portion 500, and a control signal output from the processor 410.

The memory 420 may include a volatile memory (not shown) such as a static random access memory (S-RAM), a dynamic random access memory (D-RAM) and the like and a nonvolatile memory (not shown) such as a flash memory, a read only memory (ROM), an erasable programmable ROM (EPROM), an electrically erasable programmable ROM (EEPROM) and the like.

The nonvolatile memory may operate as an auxiliary memory device for the volatile memory and may store the control program and control data for controlling the operation of the cooking apparatus 100. The nonvolatile memory may maintain stored data even when a power source of the cooking apparatus 100 is disconnected.

The volatile memory may load and temporarily store the control program and control data from the nonvolatile memory or may temporarily store setting values and control commands input through the interface 300, a temperature inside the cooking chamber and a type and concentration of gas detected by the sensor portion 500, and a control signal output from the processor 410. The volatile memory, unlike the nonvolatile memory, may lose stored data when the power source of the cooking apparatus 100 is disconnected.

The processor 410 may process setting values, control commands, a temperature of the cooking chamber, a type and concentration of gas and the like according to the control program and control data stored in the memory 420 and may output a control signal for controlling the heating portion 600 and a communication signal for communicating with an external electronic device.

For example, the processor 410 determines a cooking mode, a cooking temperature, a cooking time and the like according to a setting value and a control command input by the user. Also, the processor 410 may output a heating control signal for operating the heating portion 600 or stopping an operation of the heating portion 600 according to a temperature of the cooking chamber detected by the temperature sensor 520.

Also, although described below, when the knob 200 rotates while being attached to at least one of one surface of the body 10, the input unit 310, and the display 320, the controller 400 may determine a degree of rotation of the knob 200 according to a touch position of the knob 200 sensed by a touch sensor 313 and may control at least one of a heating time and a heating temperature of the heating portion 600 according to a result of determination.

Among a plurality of such heating portions 600, the heating portion that becomes an object of controlling a heating temperature and a heating time thereof may be arbitrarily selected by an operation of the user.

For example, when a button provided at the display 320 and corresponding to a first cooktop 31a is selected and then the knob 200 is rotated, the controller 400 may control only a temperature of the first cooktop 31a. When a button corresponding to the first cooking chamber 28 is selected and the knob 200 is rotated, the controller 400 may control only a temperature of the first cooking chamber 28. Also, when a button for controlling both the first cooking chamber 28 and the second cooking chamber 29 is selected, the controller 400 may control temperatures of both the cooking chambers 28 and 29 in common.

Also, although described below, the heating portion 600 that is an object for adjusting a heating temperature and a heating time thereof may be selected by controlling a selector 230 provided at the knob 200 not a button provided at the display 320.

As described above, the controller 400 may control operations of various components included in the cooking apparatus 100. Also, it should be understood that operations of the cooking apparatus 100 which will be described below are caused by a control operation of the controller 400.

As described above, external components and internal components of the cooking apparatus 100 have been described. Hereafter, features of the cooking apparatus 100 using the knob 200 and a method of controlling the cooking apparatus 100 will be described with reference to the drawing.

Figure 4:
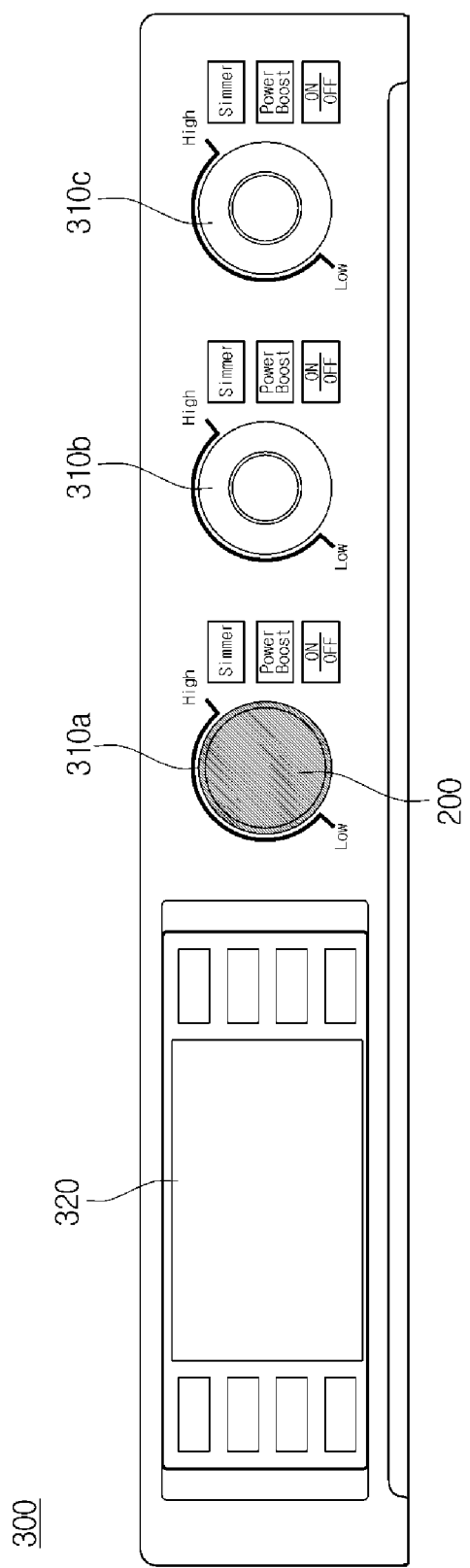
FIG. 4 is a view illustrating an external shape of an interface of the cooking apparatus according to one embodiment.

FIG. 4 is a view illustrating one part of the interface 300 according to one embodiment.

Referring to FIG. 4, the interface 300 may include the input unit 310 configured to receive a command in relation to controlling the cooking apparatus 100 or information in relation to the cooking apparatus 100 from the user and the display 320 configured to display a present cooking state and a cooking result of the cooking apparatus 100.

The interface 300 has been shown as being provided at a front surface of the cooking apparatus 100 in FIGS. 1 and 4 but is not limited thereto and may be provided at one side of the body 10 of the cooking apparatus 100.

Also, the number of such input units 310 may be provided to be the same as the number of the heating portions 600 included in the cooking apparatus 100. That is, a plurality of such input units 310 may be provided.

The cooking apparatus 100 according to one embodiment may receive a command in relation to controlling the cooking apparatus 100 from the user in various methods.

When the user attaches the knob 200 to the input unit 310 and inputs a command using the knob 200, the user may control at least one of a heating temperature and a heating time of each of the heating portions 600 by rotating the knob 200 by a desirable degree in a desirable direction.

On the other hand, when the user inputs a command directly using the input unit 310 without attaching the knob 200, the user may control at least one of a heating temperature and a heating time of each heating portion 600 by directly touching the input unit 310 with a finger.

In FIG. 4, it may be known that the knob 200 is attached to a top end of a first input unit 310a among the plurality of input units 310. Here, in this case, the user may input a command in relation to controlling the cooking apparatus 100 by adjusting the first input unit 310a using the knob 200.

Also, in the case of a second input unit 310b or a third input unit 310c to which the knob 200 is not attached, the user may input a command in relation to controlling the cooking apparatus 100 by directly touching the input units 310b and 310c.

When the user inputs a command by directly touching the input unit 310, the user may input a desirable command using a touch pad attached to the input unit 310. That is, the user may sequentially adjust a desirable temperature by pushing a finger like the rotation of the knob 200 and may directly input a desirable temperature displayed on the input unit 310.

Also, although only one knob 200 is shown in FIG. 4, the number of knobs 200 is not limited thereto and may be as many as the number of heating portions 600 provided in the cooking apparatus 100.

Also, although the knob 200 is coupled with the first input unit 310a disposed at a leftmost part in FIG. 4, the user may attach the knob 200 attached to the first input unit 310a to be used, to the second input unit 310b or the third input unit 310c, and may input a command in relation to controlling the cooking apparatus 100. A principle of attaching or detaching the knob 200 to or from the input unit 310 will be described below with reference to FIG. 5.

Also, when the knob 200 is not used, the user may separate the knob 200 from a knob area and may store the knob 200 in an additional place. In this case, a storage area for storing the knob 200 may be additionally provided at a side surface, the front, the bottom or the like of the body 10.

When the knob 200 includes a magnetic body, a surface of the storage area may include a magnetic body having a polarity opposite to that of a surface of the magnetic body of the knob 200 to store the knob 200 while being attached to the body 10.

Figure 5:
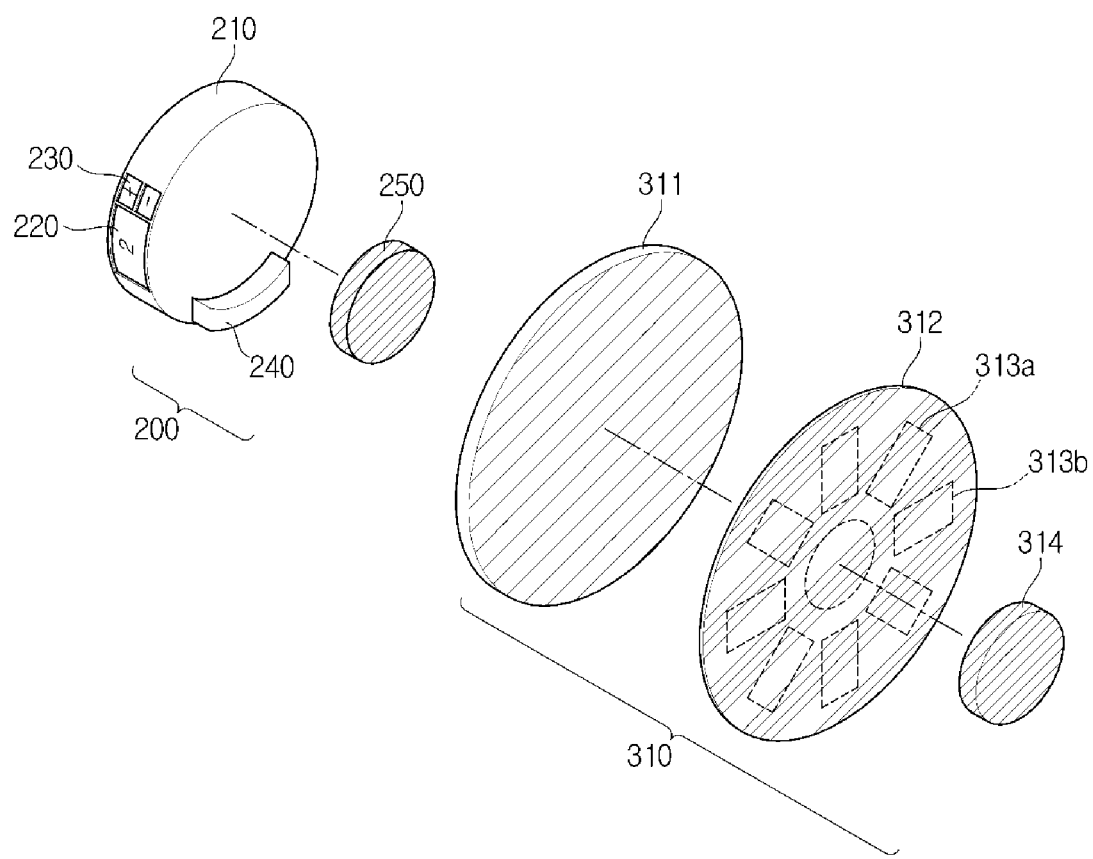
FIG. 5 is an exploded perspective view illustrating components of a knob and an input unit according to one embodiment.
Figure 6:
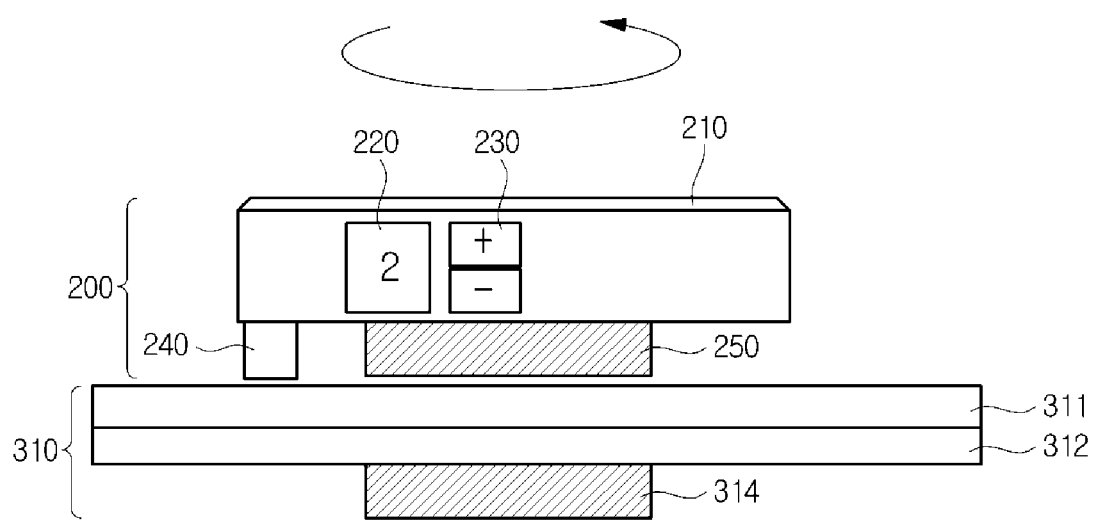
FIG. 6 is a view illustrating one example in which the knob and the input unit according to one embodiment of the present disclosure are attached.

FIG. 5 is an exploded perspective view illustrating components before the knob 200 and the input unit 310 are attached according to one embodiment, and FIG. 6 is a side view illustrating the knob 200 and the input unit 310 attached to each other in one view.

Referring to FIG. 5, the knob 200 according to one embodiment may include a knob body 210, an indicator 220 that indicates a number of the heating portion 600 selected as an object to be currently controlled, the selector 230 for selecting the heating portion to be controlled, and a first magnetic body 250 configured to help combination between the knob 200 and the input unit 310.

The input unit 310 may include an uninsulated plate 311, a printed circuit board (PCB) 312 including a plurality of touch sensors 313, and a second magnetic body 314 configured to help combination between the knob 200 and the input unit 310.

The knob body 210 is a part where a user touch is performed. The user may input a particular command in relation to controlling the cooking apparatus 100 by rotating the knob body 210.

Accordingly, the knob body 210 generally has a circular shape but is not limited thereto and may have various shapes derived from a circular shape.

The indicator 220 may indicate the number of the heating portion 600 which is currently controlled.

When one heating portion 600 is controlled by the cooking apparatus 100, it is unnecessary to indicate which heating portion 600 is currently controlled. However, when the plurality of heating portions 600 are controlled by one knob 200, the indicator 220 may indicate which heating portion 600 is currently controlled to prevent the user from being confused.

Referring to FIG. 1, the cooking apparatus 100 includes three cooktops 30 which may be designated as 1, 2, and 3. Accordingly, the user may easily recognize which cooktop 30 is currently controlled by the knob 200 through the indicator 220 of the knob 200.

The cooking chamber 20 may also be provided as a plurality of cooking chambers 28 and 29 as shown in FIG. 2. The user may easily recognize which cooking chamber is currently controlled through the indicator 220 of the knob 200.

For example, the first cooking chamber 28 is designated as 4 and the second cooking chamber 29 is designated as 5 or the numbers of the cooktops 30 are designated as C1, C2, and C3 and the first cooking chamber 28 is designated as F1 and the second cooking chamber 29 are designated as F2. Then, which heating portion 600 is currently controlled may be indicated through the display 320 using these characters.

Also, the display 320 is disposed on a side of the knob 200 in FIG. 4 but is not limited thereto and may be disposed in various positions at the knob 200 including a top of the knob 200.

The selector 230 may allow the user to select a particular one of the plurality of heating portions 600 to be controlled.

As shown in FIGS. 1 and 2, since the cooking apparatus 100 may include the plurality of cooktops 31a, 31b, and 31c provided at the top of the body 10 and the plurality of cooking chambers 28 and 29 provided in the body 10, the user may select the particular cooktops 31a, 31b, and 31c or the particular cooking chambers 28 and 29 by using the selector 230.

The user may select the particular heating portion 600 by using (+) and (−) buttons as shown in FIGS. 5 and 6 and may select the particular heating portion 600 by using another smaller knob (not shown) attached to the body 10.

Also, the knob 200 may include a protrusion 240 for touching the touch sensor 313 which will be described below.

The protrusion 240 may protrude below the knob 200 to come into contact with the touch sensor 313 included in the PCB 312 as shown in FIG. 5.

However, the disposition of the protrusion 240 is not limited to be downward and may be formed at any place including the top and side of the knob 200 in a direction which faces the body 10 of the cooking apparatus 100.

Also, the protrusion 240 may include a material that allows the touch sensor 313 to sense a touch.

For example, when the PCB 312 includes the touch sensor 313 including a capacitive touch sensor, the protrusion 240 may include a conductive material integrated with a handle member of the knob 200 to discharge a condenser of the touch sensor into a human body of the user who holds the knob 200. The protrusion 240 may be formed with a size to touch the plurality of touch sensors 313 at one time.

Also, the knob 200 may include the first magnetic body 250 for easy attachment with the input unit 310.

In detail, when the knob 200 reaches or is attached to the input unit 310, there is formed attraction between the first magnetic body 250 of the knob 200 and the second magnetic body 314 of the input unit 310 which will be described below in such a way that the knob 200 and the input unit 310 may be easily attached to each other due to this attraction.

Here, the first magnetic body 250 and the second magnetic body 314 may include a ferromagnetic material in which magnetic moment is aligned.

Also, a surface of the first magnetic body 250 which faces the input unit 310 and a surface of the second magnetic body 314 which faces the knob 200 may have different polarities from each other. In this case, since the attraction acts between the first magnetic body 250 and the second magnetic body 314, the knob 200 and the input unit 310 may be more strongly attached to each other.

The input unit 310 may receive a user command for controlling the cooking apparatus 100 via the knob 200 when the knob 200 is attached thereto or may receive a user command by sensing a finger of the user when the knob 200 is not attached.

Accordingly, the input unit 310 may include the uninsulated plate 311, the PCB 312 including the plurality of touch sensors 313, and the second magnetic body 314 configured to help combination between the knob 200 and the input unit 310.

The uninsulated plate 311 refers to a top end of the input unit 310 attached to a bottom of the knob 200 and protects the PCB 312 from the outside.

Generally, the uninsulated plate 311 includes a well electrified or heated material and may include a material such as glass or the like.

The PCB 312 may include the plurality of touch sensors 313 capable of sensing a touch and a rotational direction of the knob 200 and various circuit devices (not shown) necessary for sensing a touch.

When the knob 200 is attached to the input unit 310, the plurality of touch sensors 313 may detect various operations of the user by sensing the rotational direction and velocity of the knob 200.

Accordingly, the touch sensors 313 may be arranged to surround an area in which the knob 200 is attached with a certain size.

In detail, as shown in FIG. 5, the plurality of touch sensors 313 may be arranged on the PCB 312 in a circular shape to consecutively sense a touch according to a rotational path of the knob 200 even when the attached knob 200 is rotated by an operation of the user.

Accordingly, since the protrusion 240 also rotates when the user rotates the knob 200 by operating the knob 200, a touch point sensed by the touch sensors 313 may also be changed. Accordingly, the controller 400 may sense this change and recognize a user command.

Also, the touch sensors 313 may use a resistant film, capacitance, surface acoustic wave (SAW), infrared (IR), or optical method.

Meanwhile, when the knob 200 is not attached to the input unit 310, the input unit 310 may sense a touch caused by an input means different from the knob 200.

For example, when the user touches the input unit 310 with a part of the user's body such as a finger and the like, the touch sensor 313 may sense the touch and may receive a particular command of the user for controlling the cooking apparatus 100.

With reference to FIG. 5, a structure of the knob 200 and a structure of the input unit 310 have been described. Hereafter, an attachment shape and an interaction principle of the knob 200 and input unit 310 will be described with reference to FIGS. 6 to 10.

FIG. 6 is a perspective view illustrating a shape in which the knob 200 is attached to the input unit 310 according to one embodiment.

Since the structures of the knob 200 and the input unit 310 have been described with reference to FIG. 5, a description of components will be omitted and the attachment principle and an operation principle of the knob 200 and the input unit 310 will be described with reference to FIG. 6.

Referring to FIG. 6, the knob 200 may be attached to or detached from the uninsulated plate 311 which is an upper component of the input unit 310.

When the knob 200 is attached, the user may input a command in relation to controlling the cooking apparatus 100 by rotating the knob 200 while the knob 200 is attached to the input unit 310.

The knob 200 may be attached to the body 10 using various methods according to embodiments and may be attached or detached using a magnetic force as described above.

The user may rotate the knob 200 while the knob 200 is attached. In detail, the knob 200 may rotate around the first magnetic body 250 as a central shaft. Here, the first magnetic body 250 may have a cylindrical shape.

Also, the knob 200 may be configured to be integrated with the first magnetic body 250 in such a way that the knob 200 itself rotates around the first magnetic body 250 and may include a fixer (not shown) configured to fix the first magnetic body 250 and a rotator (not shown) configured to rotate around the fixer.

In this case, a bearing may be inserted between the fixer and the rotator to allow the rotator to rotate along an outer circumferential surface of the fixer.

Meanwhile, it may be sensed using various methods whether the knob 200 is detached from or attached to the input unit 310 or whether a touch by a hand of a human is present, which will be described with reference to FIGS. 7A and 7B.

Figure 7A:
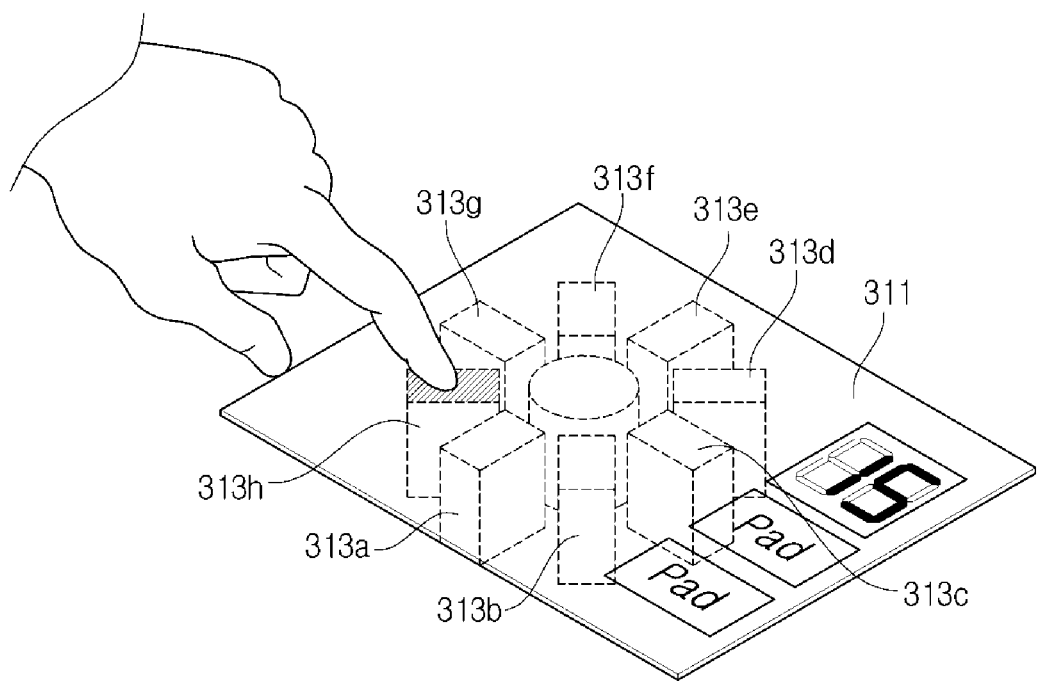
FIGS. 7A and 7B are views illustrating a principle in which a touch sensor according to one embodiment senses a hand of a user.
Figure 7B:
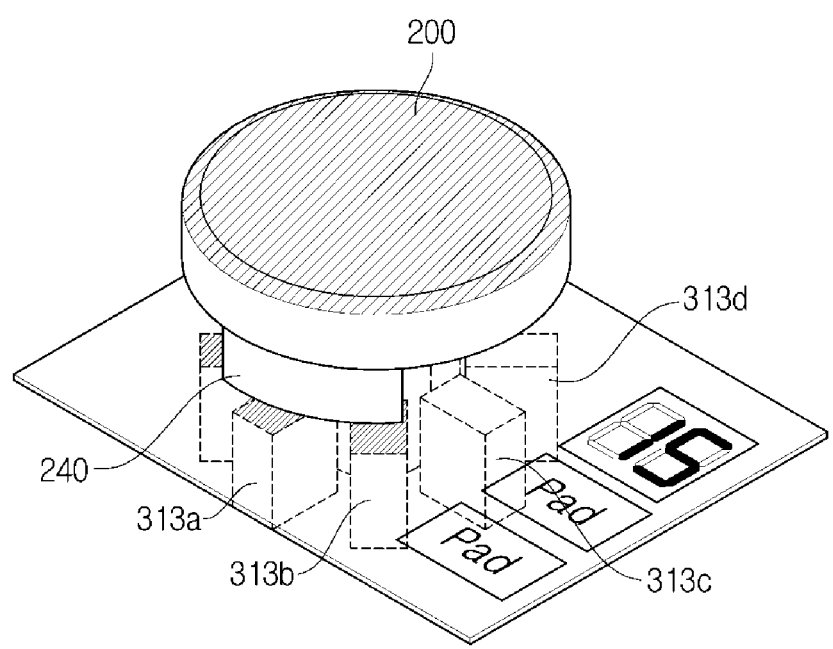

FIG. 7A is a view illustrating a state in which a finger of a user touches a particular point of the uninsulated plate 311 positioned above the input unit 310, and FIG. 7B is a view illustrating a state in which the knob 200 touches a particular point of the uninsulated plate 311 positioned above the input unit 310.

Referring to FIG. 7A, it may be known that the finger of the user touches an upper point corresponding to an eighth touch sensor 313h among the plurality of touch sensors 313.

Generally, an area of the input unit 310, which is touched by a human finger, merely has a size corresponding to one of the touch sensors 313. Accordingly, when a touch signal is sensed by only one of the touch sensors 313, the controller 400 may recognize that the finger touches the input unit 310.

That is, when only one signal is received from the plurality of touch sensors 313, the controller 400 may determine that the finger of the human touches the input unit 310 and may control at least one of the input unit 310 and the display 320 to allow the input unit 310 to receive a command of the user.

However, when the knob 200 is attached to the input unit 310, since an area of the knob 200, which is touched by the protrusion 240, is relatively larger than the area touched by the finger, the number of touch sensors 313 whose touch signals are sensed also increases.

Accordingly, when the knob 200 is attached to the input unit 310 as shown in FIG. 7B, three touch sensors 313h, 313a, and 313b among the plurality of touch sensors 313 may sense the protrusion 240 of the knob 200. In this case, it may be determined that the knob 200 is attached.

That is, when a plurality of signals are received from the plurality of touch sensors 313, the controller 400 may determine that the knob 200 is attached and may control at least one of the input unit 310 and the display 320 to receive a command from the user via the knob 200.

Also, for example, although not shown in the drawing, the controller 400 may further include a sensor for sensing whether the knob 200 is attached or detached.

In detail, the input unit 310 may further include a hall sensor on one side of an area to or from which the knob 200 is attached or detached and the controller 400 may sense whether the knob 200 is attached or detached, using the hall sensor.

That is, when the knob 200 approaches the input unit 310, the hall sensor may sense a magnetic field changed by the first magnetic body 250 of the knob 200 and the second magnetic body 314 of the input unit 310 and then may transmit a sensed signal to the controller 400, and the controller 400 may determine whether the knob 200 is attached or detached, based on the received signal.

Through the above processes, when it is determined that the knob 200 is attached to the input unit 310, the controller 400 may check a rotational direction and a rotational speed and may determine the command from the user based thereon. Hereafter, it will be described in detail with reference to FIG. 8.

Figure 8A:
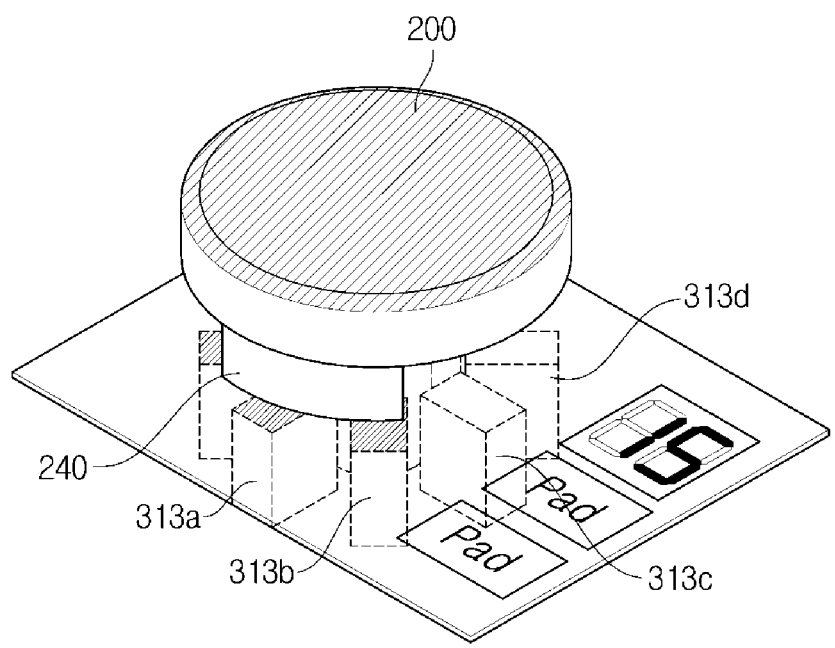
FIGS. 8A and 8B are views illustrating a principle in which the touch sensor according to one embodiment senses whether the knob is attached.
Figure 8B:
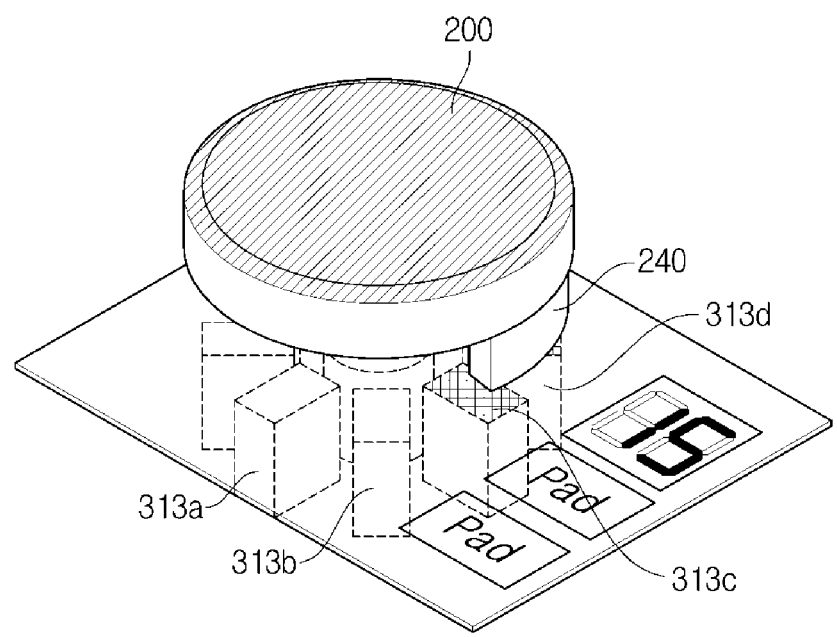

FIG. 8A illustrates a state in which the knob 200 is attached to the input unit 310, and FIG. 8B illustrates a state in which the knob 200 is attached and rotates counterclockwise from a still state.

As shown in FIGS. 8A and 8B, the protrusion 240 may be formed at the bottom of the knob 200. The controller 400 may determine a degree of rotation and a rotational speed of the knob 200 according to a touch position at which the protrusion 240 touches the touch sensors 313.

The degree of rotation is a term for defining how rotation is performed and may include a rotational direction, a rotational distance, the rotational speed and the like.

In detail, when the knob 200 rotates while being attached to the input unit 310, the protrusion 240 of the knob 200 sequentially touches the plurality of touch sensors 313 provided at the input unit 310.

In this case, each of the touch sensors 313 transmits a touch sensing signal to the controller 400, and the controller 400 determines the degree of rotation and the rotational direction of the knob 200 by considering the number and positions of the touch sensors 313 which transmit the touch sensing signals and then may control a heating temperature and a heating time of the heating portion 600 to be controlled.

For example, it is assumed that eight touch sensors 313 arranged in a circular shape are present as shown in FIGS. 8A and 8B.

Each of the touch sensors 313 may transmit a touch sensing signal to the controller 400 when being touched with the protrusion 240.

When the controller 400 receives touch sensing signals from the three touch sensors 313h, 313a, and 313b as shown in FIG. 8A and then receives touch sensing signals from three touch sensors 313c, 313d, and 313e as shown in FIG. 8B, the controller 400 may determine that the user rotates the knob 200 counterclockwise by 90 degrees.

Accordingly, the controller 400 may decrease a heater temperature of the heating portion 600 to be controlled, by two levels.

On the other hand, when it is determined that the user rotates the knob 200 clockwise by 90 degrees, a temperature of the heating portion 600 may be increased by two levels.

Also, it is merely an example to change a temperature by two levels when the knob 200 is rotated by 90 degrees. Levels of temperature and time changeable according to a degree of rotation may differ depending on user preference.

As another example, when the knob 200 rotates and the controller 400 receives touch sensing signals from the three touch sensors 313b, 313c, and 313d and then receives touch sensing signals from the three touch sensors 313a, 313b, and 313c while the heating portion 600 to be controlled is turned off (OFF), the controller 400 may determine that the user rotates the knob 200 clockwise by 45 degrees.

Accordingly, the controller 400 may determine this case to be a command for increasing a temperature by one level, may turn on the heating portion 600 which is turned off, and may increase a temperature thereof by one level.

Also, although FIGS. 6 to 8B illustrate states in which the knob 200 is attached to the input unit 310, since the knob 200 is detachable from the input unit 310 as described above, a place touched by the protrusion 240, that is, a touch point touched by the touch sensor 313 may be changed.

Accordingly, in this case, when the knob 200 is separated and then is attached again, the controller 400 may adjust a temperature and time by determining a degree of rotation based on an initial touch point.

For example, when it is determined that the knob 200 is attached and rotated clockwise by 90 degrees by the user while a temperature of the heating portion 600 to be heated is heated by two levels, the controller 400 may increase the temperature of the heating portion 600 from a second level to a fourth level.

On the other hand, when the knob 200 is rotated counterclockwise by 90 degrees, the temperature of the heating portion 600 to be controlled may be decreased from the second level to a zeroth level, that is, power may be turned off (OFF).

Also, the controller 400 may calculate the degree of rotation of the knob 200 according to time and may change a variation of adjusting the heating time or heating temperature of the heating portion 600 to be controlled, according to the rotational speed of the knob 200.

In detail, the controller 400 may quickly control an increase or decrease of the heating time or the heating temperature of the heating portion 600 to be controlled, as the rotational speed of the knob 200 is high.

Figure 10A:
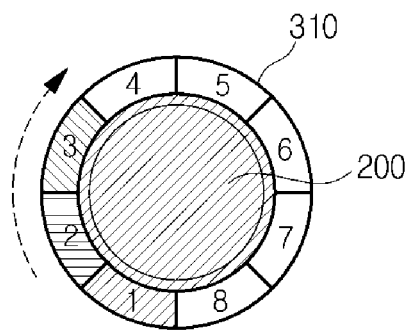
FIGS. 10A to 10C are views illustrating a method of controlling the cooking apparatus when the knob is switched from the attached state to the unattached state, according to one embodiment.
Figure 10B:
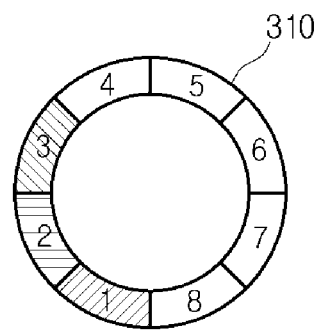
Figure 10C:
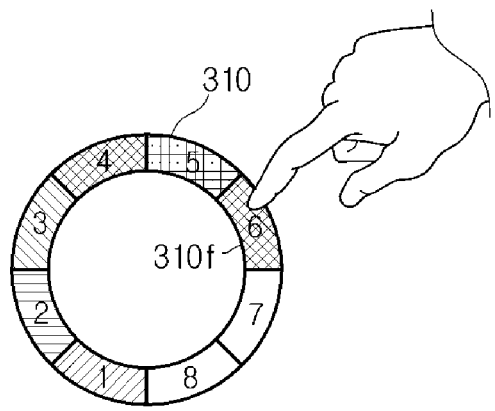
Figure 11A:
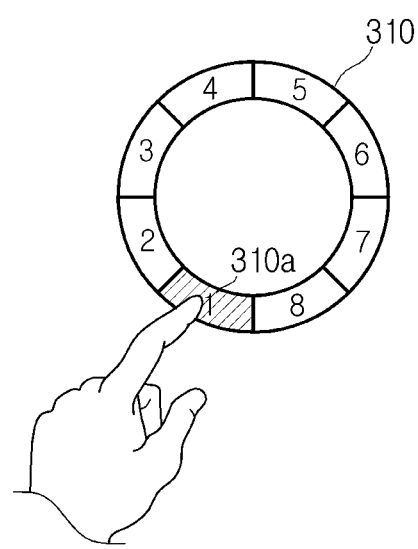
FIGS. 11A to 11C are views illustrating a method of controlling the cooking apparatus when the knob is switched from the unattached state to the attached state, according to one embodiment.
Figure 11B:
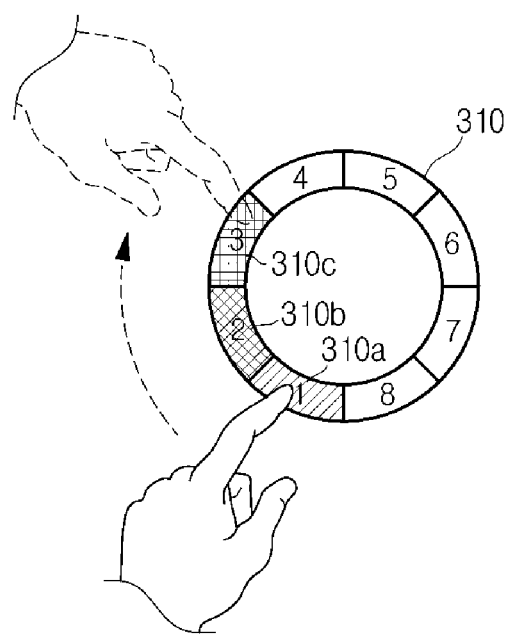
Figure 11C:
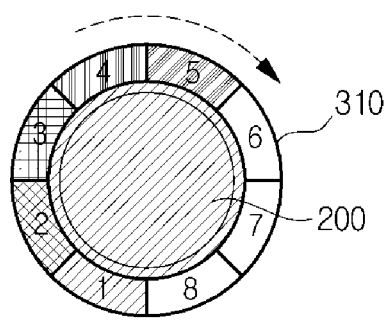

FIGS. 9A to 11C illustrate embodiments of the description with reference to FIGS. 6 to 8B. FIGS. 9A to 9C are views illustrating a method of controlling the cooking apparatus 100 when the knob 200 is not attached. FIGS. 10A to 10C are views illustrating a method of controlling the cooking apparatus 100 when the knob 200 is detached from a state of being attached. FIGS. 11A to 11C are views illustrating a method of controlling the cooking apparatus 100 when the knob 200 is attached in a state of being not attached.

FIG. 9A illustrates a state in which the user touches the first input unit 310a of the input unit 310 with a finger when the knob 200 is not attached. In this case, the input unit 310 may recognize a touch of the finger of the user and may display that a temperature of the heating portion 600 which is currently controlled is a first level, using the first input unit 310a as shown in the drawing.

After that, the user may adjust the temperature of the heating portion 600 by rotating the user's finger while pushing, like rotating the knob 200.

That is, as shown in FIG. 9B, the user may touch the first input unit 310a and then may sequentially touch the second input unit 310b, the third input unit 310c, and a fourth input unit 310d. Accordingly, eventually, the user may adjust the temperature of the heating portion 600 to be controlled, by four levels.

Also, unlike FIG. 9B in which the temperature is sequentially changed, the temperature of the heating portion 600 may be directly changed by directly touching a desirable temperature.

That is, when the user touches the first input unit 310a with a finger and immediately touches the fourth input unit 310d, the controller 400 recognizes a temperature input by the user as a fourth level and controls the temperature of the heating portion 600 to be the fourth level. Accordingly, in this case, the fourth input unit 310d may be touched and simultaneously the second input unit 310b and the third input unit 310c may also be displayed as shown in FIG. 9C.

In the case of a conventional technology, when a temperature is adjusted by a touch, to input a desirable temperature, the temperature is sequentially increased as shown in FIG. 9B. However, in the embodiment, since a temperature may be directly changed as shown in FIG. 9C, there is an advantage of more quickly changing the temperature of the heating portion 600 to be controlled.

FIGS. 10A to 10C are views illustrating a method of adjusting a temperature of the heating portion 600 to be controlled, when the knob 200 is detached in a state of being attached to the input unit 310.

FIG. 10A illustrates a state in which the user changes the temperature of the heating portion 600 to be heated, to a third level using the knob 200. FIG. 10B illustrates a state in which the temperature is changed to the third level and the user detaches the knob 200. FIG. 10C illustrates a state in which a heating temperature is adjusted by a finger when the knob 200 is detached.

Referring to FIG. 10B, in the embodiment, even when the knob 200 is detached, the temperature of the heating portion 600 is not changed and continuously remains at the third level. In the case of the general technology, there is an inconvenience of adjusting the temperature of the heating portion 600 all over again when the knob 200 is detached or attached. In the embodiment, since the temperature of the heating portion 600 which is being heated is continuously maintained regardless of detachment or attachment of the knob 200, there is an advantage of allowing the user to consecutively adjust the temperature.

Accordingly, the user may consecutively adjust the temperature using a finger even when the knob 200 is removed and may immediately change the temperature to a sixth level by directly inputting a sixth input unit 310f when the knob 200 is removed as shown in FIG. 10C. In this case, the fourth input unit 310d and a fifth input unit 310e which are not touched are also shown as shown in FIG. 10C.

Also, although not shown in the drawing, it is possible to change the temperature to the sixth level by sequentially touching the fourth input unit 310d, the fifth input unit 310e, and the sixth input unit 310f with a finger.

FIGS. 11A to 11C are views illustrating a method of adjusting a temperature of the heating portion 600 to be controlled, when the knob 200 is attached in a state of being not attached to the input unit 310.

FIGS. 11A and 11B are views illustrating a state in which the user directly changes the temperature of the heating portion 600 from the first level to the third level using a finger when the knob 200 is not attached, and FIG. 11C is a view illustrating a state in which the knob 200 is attached and then the temperature is adjusted using the knob 200.

Referring to FIGS. 11B and 11C, even when the knob 200 is attached in a state of being detached, the temperature of the heating portion 600 is not changed and continuously remains at the third level and the user may consecutively control the temperature using the knob 200.

That is, the controller 400 may control the temperature using a relative rotational direction and rotational distance of the knob 200 regardless of which one of the plurality of touch sensors 313 the protrusion 240 of the attached knob 200 touches.

Accordingly, when the knob 200 is attached and then the user rotates the knob 200 clockwise by 90 degrees as shown in FIG. 11C, the controller 400 may recognize the rotation as a command of increasing a temperature by two levels and may increase a heating temperature of the heating portion 600 from the third level to the fifth level.

On the other hand, when the knob 200 is attached and then the user rotates the knob 200 counterclockwise by 90 degrees, the controller 400 may recognize the rotation as a command of decreasing a temperature by two levels and may decrease a heating temperature of the heating portion 600 from the third level to the first level.

Hitherto, the state in which the knob 200 is attached to the input unit 310 and the principle of operating the knob 200 have been described with reference to the drawings. Hereafter, a method of controlling the cooking apparatus 100, to which this principle is applied, will be described with reference to the drawings.

Figure 12:
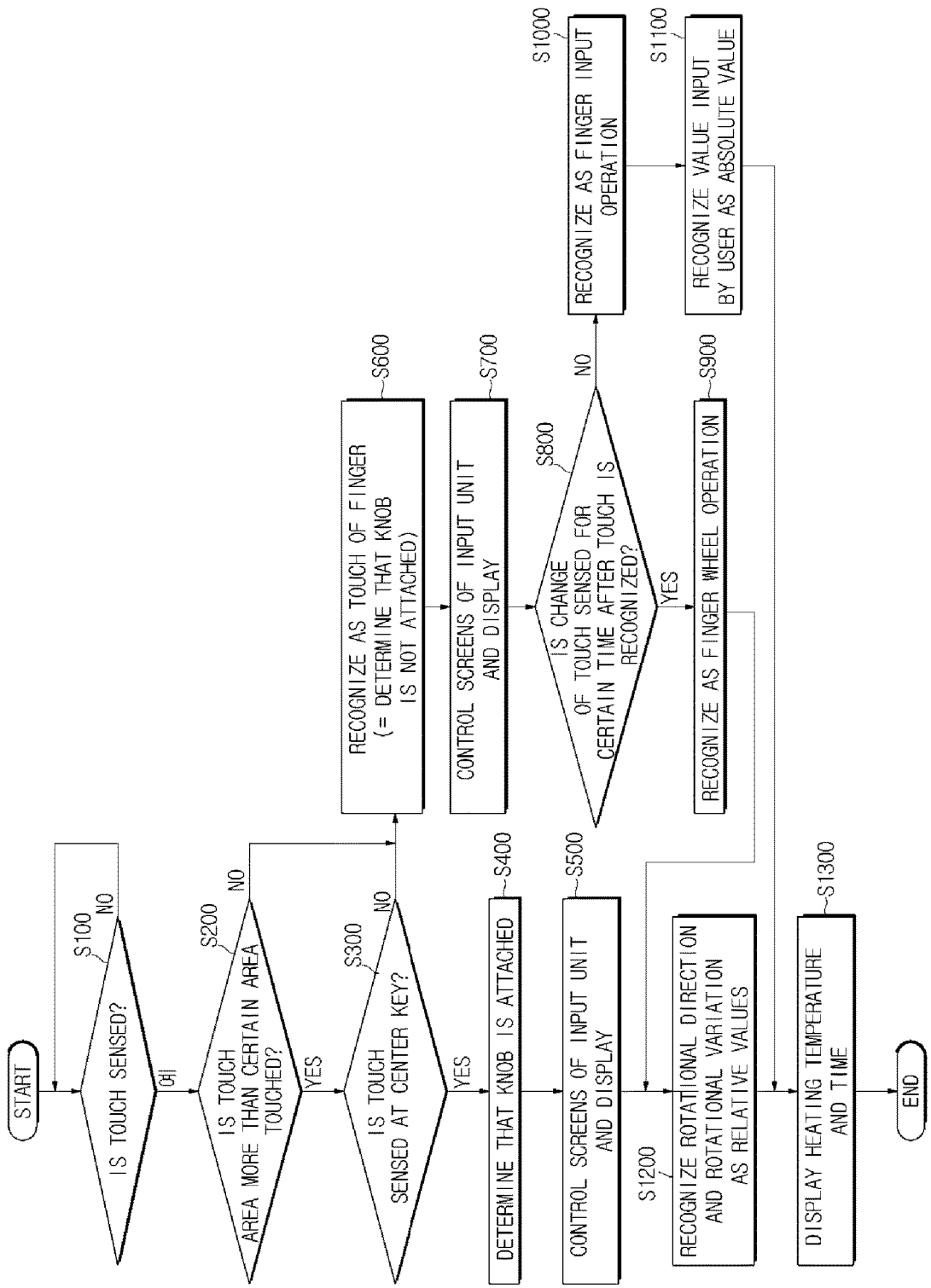
FIG. 12 is a flowchart illustrating a flow of operations of the cooking apparatus according to one embodiment.

FIG. 12 is a flowchart illustrating a flow of operations of the cooking apparatus 100 according to one embodiment.

Referring to FIG. 12, in the embodiment, it is determined whether a touch is sensed at one surface of the cooking apparatus 100 or an area of the input unit 310 (S100).

When the touch is sensed, to determine whether this touch is a touch by a human finger or a touch by the knob 200, whether a touched area is greater than a certain area and whether a touch signal is sensed by a center key are determined (S200).

The above-described determination process, as described with reference to FIGS. 7A to 8B, is performed based on the number of touch sensors 313 whose touch signals are sensed. Generally, when one touch signal is sensed, it is determined that a contact is caused by a finger of a user. Otherwise, it is determined that a contact is caused by the knob 200.

However, even when the touch signal is sensed more than the certain area in S200, the touch may be recognized as being caused by the knob 200 when the user touches several sections at the same time by a laid finger. Accordingly, it is determined whether a touch signal is sensed at the center key (S300).

When the knob 200 is attached, the center key may sense a touch signal due to a structural feature of the knob 200. However, when a touch is performed by a finger, it is difficult for the center key to sense a touch signal due to the feature thereof. Accordingly, through this process, it may be precisely determined whether the knob 200 is attached.

When a touch area is sensed more than the certain area and a touch signal is sensed at the center key, it is determined that the knob 200 is attached (S400) and screens of the input unit 310 and the display 320 are controlled to allow the user to easily control the cooking apparatus 100 by using the knob 200 (S500).

When the touch area is not sensed more than the certain area or the touch signal is not sensed at the center key although the touch area is sensed more than the certain area, it is determined that the knob 200 is not attached. That is, it is determined that the touch is performed by a finger (S600).

When it is determined that the knob 200 is not attached in S600, the screens of the input unit 310 and the display 320 are controlled to allow the user to easily control the cooking apparatus 100 using a touch (S700).

When it is recognized that the touch is performed by the finger, it is sensed whether there is a change in touch after recognizing the touch (S800).

The change in touch means a change of a touch sensing signal transmitted by the touch sensor 313 and refers to a sequential change of an order of the touch sensors 313 that transmit the touch sensing signals. In this case, even when the touch is performed by the finger, since the user touches with the finger like pushing as the knob 200 rotates, the touch is recognized as a finger wheel operation (S900).

When it is determined that the knob 200 is attached in S400 or it is determined that the touch is performed as the finger wheel operation in S900, rotational directions and rotational variations of the knob 200 and the finger are recognized as relative values and then a heating temperature and a heating time are controlled and displayed outside (S1200 and S1300)

Being recognized as the relative values means changing a temperature by a variation measured from a final temperature state as described with reference to FIGS. 11A to 11C.

When the touch is recognized in S800 and then a change in touch is not sensed for a certain time, it is recognized that the user directly inputs a desirable temperature and time (S1000).

Accordingly, in this case, a value input by the user is recognized as an absolute value (S1100). Instead of sequentially increasing or decreasing the heating temperature or the heating time, the cooking apparatus 100 is directly controlled according to the heating temperature and heating time input by the user and displayed outside (S1100 and S1300)

Figure 13:
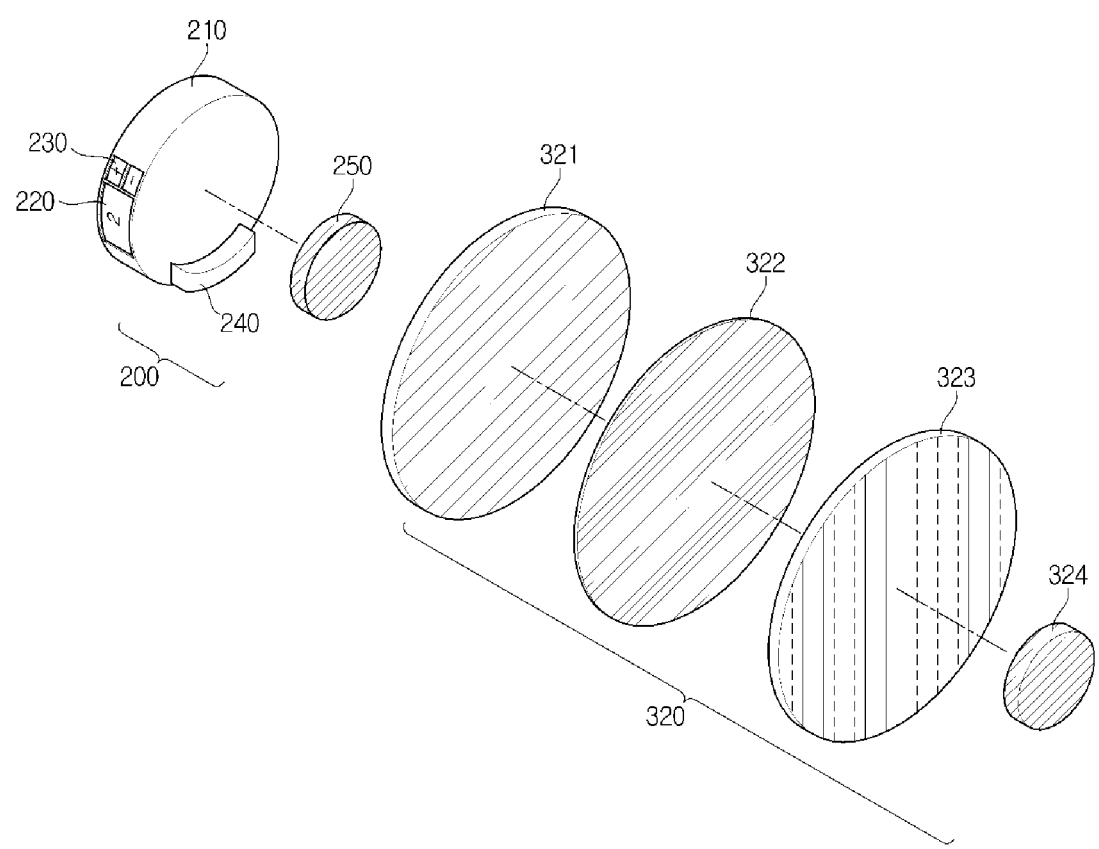
FIG. 13 is an exploded perspective view illustrating components of a knob and a display according to another embodiment.
Figure 14:
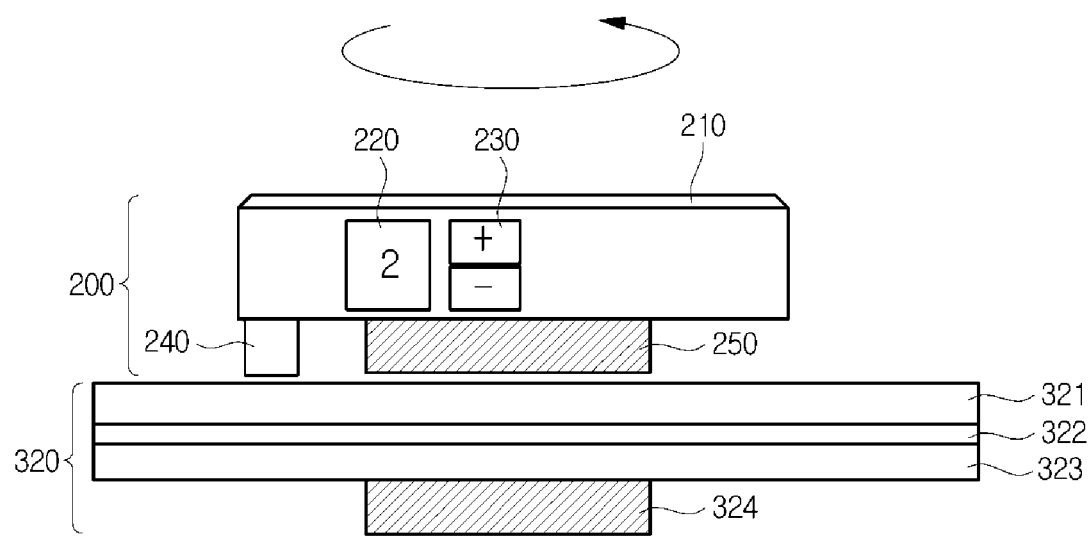
FIG. 14 is a view illustrating one example in which the knob and the display are attached according to another embodiment.

FIGS. 13 and 14 are views illustrating the knob 200 and the display 320 according to anther embodiment. FIG. 13 is an exploded perspective view illustrating components of the knob 200 and the display 320, and FIG. 14 is a perspective view illustrating one side of a state in which the knob 200 and the display 320 are attached to each other.

Referring to FIG. 13, the knob 200 according to one embodiment may include the knob body 210, the indicator 220 that indicates a number of the heating portion selected as an object to be currently controlled, the selector 230 for selecting a particular heating portion to be controlled, and the first magnetic body 250 configured to help combination between the knob 200 and the display 320.

The display 320 may include an uninsulated plate 321 in contact with the knob 200, a touch film 322 configured to sense a touch of the protrusion 240 of the knob 200, a display panel 323, and a second magnetic body 324 configured to help the knob 200 and the display 320 to be easily combined with each other.

Since the knob 200 as shown in FIG. 13 has the same structure and features of the knob 200 described with reference to FIGS. 5 and 6, the structure and features of the knob 200 will be omitted.

The uninsulated plate 321 of the display 320 is a surface attached to the bottom of the knob 200 and refers to an uppermost end of the display 320. The uninsulated plate 321 protects the touch film 322 and the display panel 323 from the outside.

Generally, the uninsulated plate 321 includes a well electrified or heated material and may include a material such as glass, injection molding or the like.

The touch film 322 refers to a film configured to sense a touch and a rotational direction of the knob 200 and detects various operations of the user.

The touch film 322 may be manufactured using a transparent film, and in this case, a synthetic resin of a transparent material may be used.

As the above-described transparent film, an optical polyethylene terephthalate (PET) film, a poly methyl methacrylate (PMMA) film, or a transparent polycarbonate (PC) film or the like, which are transparent and have high strength, may be used.

Also, a transparent film 322 may include indium tin oxide (ITO) formed by doping indium oxide with tin oxide, indium zinc oxide or the like.

Meanwhile, when the knob 200 is not attached to the display 320, the display 320 may sense a touch caused by an input means different from the knob 200.

For example, when the user touches the display 320 with a part of the user's body such as a finger and the like, the touch film 322 may sense the touch and may receive a particular command of the user for controlling the cooking apparatus 100.

Since a method of recognizing a touch and a rotational direction of the knob 200 or the finger of the user by the touch film 322 is the same as a method of recognizing a user's touch by a general touch display and is well-known to those skilled in the art, a detailed description will be omitted.

FIG. 14 is a perspective view illustrating a state in which the knob 200 is attached to the display 320 according to one embodiment.

Since the structures of the knob 200 and the display 320 have been described with reference to FIG. 13, a description thereof will be omitted and an attachment principle and an operation principle of the knob 200 and the display 320 will be described with reference to FIG. 14.

Referring to FIG. 14, the knob 200 may be attached to or detached from the uninsulated plate 321 that is an upper component of the display 320.

When the knob 200 is attached, the user may input a command in relation to controlling the cooking apparatus 100 by rotating the knob 200 while the knob 200 is attached to the display 320.

The knob 200 may be attached to the body 10 using various methods according to embodiments and may be attached or detached using a magnetic force as described above.

In detail, the knob 200 may rotate around the first magnetic body 250 as a central shaft. Here, the first magnetic body 250 may have a cylindrical shape.

Also, the knob 200 may be configured to be integrated with the first magnetic body 250 in such a way that the knob 200 itself rotates around the first magnetic body 250 and may include a fixer (not shown) configured to fix the first magnetic body 250 and a rotator (not shown) configured to rotate around the fixer.

In this case, a bearing may be inserted between the fixer and the rotator to allow the rotator to rotate along an outer circumferential surface of the fixer.

Figure 15A:
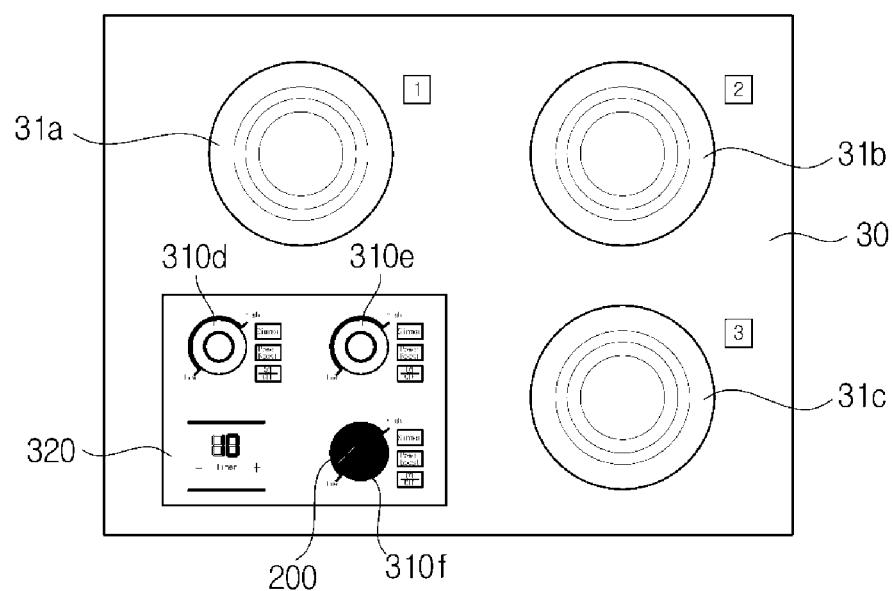
FIGS. 15A to 15C are views illustrating a state in which the knob is attached to various places of the display according to another embodiment.
Figure 15B:
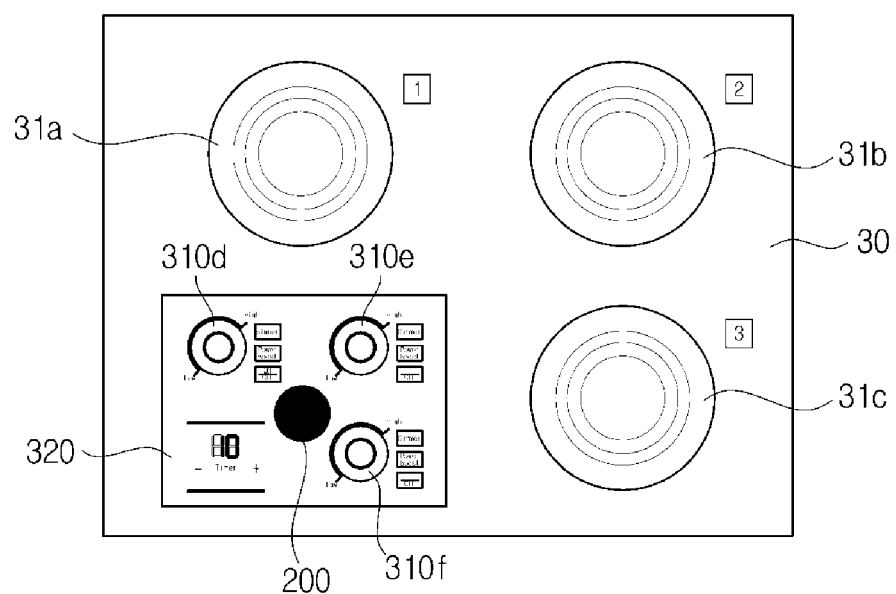
Figure 15C:
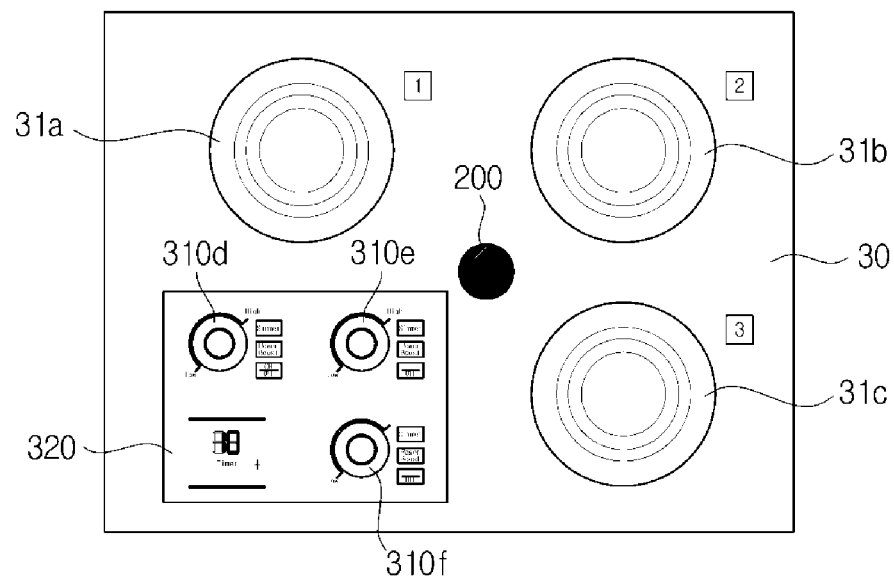

FIGS. 15A to 15C are views illustrating various cases in which the knob 200 is attached to the display 320 according to another embodiment.

Referring to FIG. 15A, the knob 200 may be attached to the sixth input unit 310f. In this case, the user may control a heating temperature or a heating time of a third cooktop 31c through the knob 200.

Also, as described above, the knob 200 may be used while not being attached to a particular input unit 310 and may be attached to other input units 310e and 310f.

However, when the knob 200 is attached to the fourth input unit 310d, the user may control a heating temperature or a heating time of the first cooktop 31a. When the knob 200 is attached to the fifth input unit 310e, the user may control a heating temperature or a heating time of a second cooktop 31b.

Also, the knob 200, as shown in FIG. 15B, may be attached to any place of the display 320. Accordingly, since the user may use the knob 200 without attaching the knob 200 to a particular one of the input units 310, there is an advantage of more easily controlling the cooking apparatus 100.

In this case, the cooktop 30 that the user can control is the heating portion which is finally controlled and the user may change the heating portion 600 to be controlled, by using the selector 230 attached to the knob 200.

Also, as shown in FIG. 15C, when a touch film is built in a bottom of the cooktop 30 though not the display 320, the cooking apparatus 100 may be controlled by attaching the knob 200 to a top of the cooktop 30. Although not shown in the drawing, the cooking apparatus 100 may be controlled by attaching the knob 200 to any place of the body 10 of the cooking apparatus 100.

Figure 16:
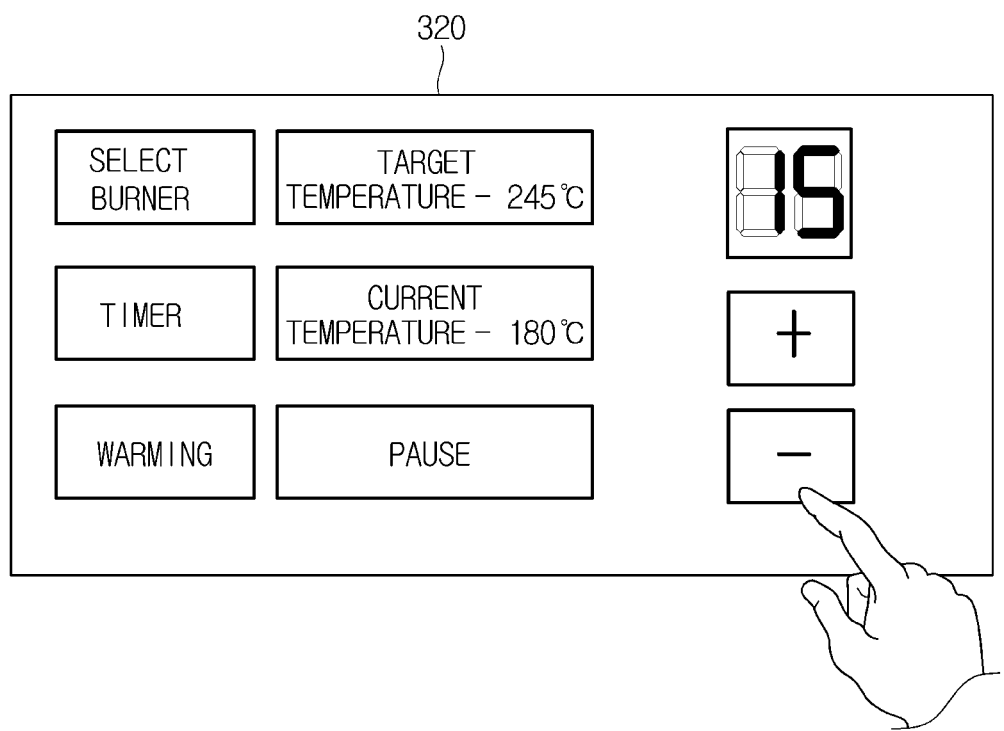
FIG. 16 is a view illustrating a state in which a user controls the cooking apparatus using touch when the knob is not attached according to another embodiment.
Figure 17A:
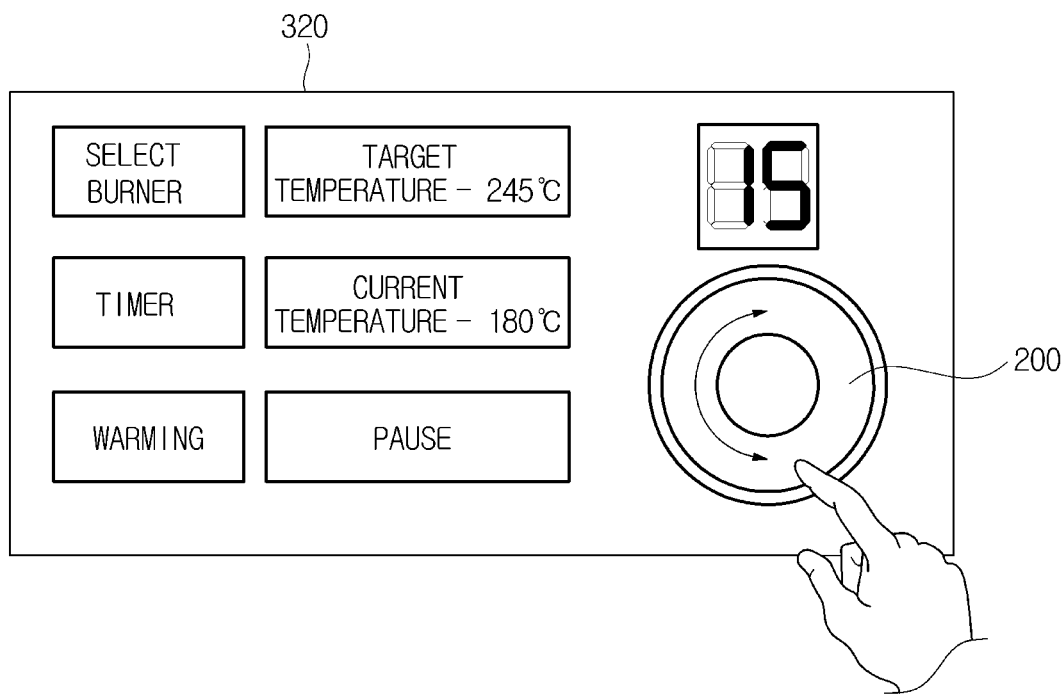
FIGS. 17A and 17B are views illustrating states in which a user controls the cooking apparatus using steps when the knob is attached to the display according to another embodiment.
Figure 17B:
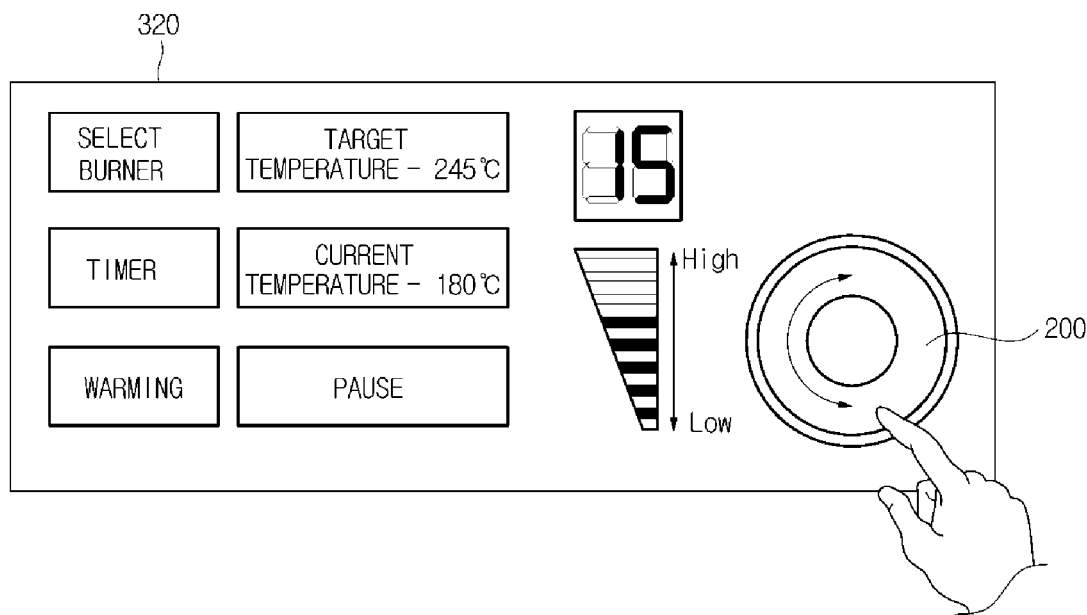

FIGS. 16 to 17B are views illustrating states in which the user controls the cooking apparatus 100. FIG. 16 is a view illustrating a state of controlling the cooking apparatus 100 by using the display 320 when the knob 200 is not attached. FIGS. 17A and 17B are views illustrating states of controlling the cooking apparatus 100 by using the knob 200 when the knob 200 is attached to the display 320.

Referring to FIG. 16, the cooking apparatus 100 may be controlled using a general method when the knob 200 is not attached to the display 320. That is, the user may input a particular command in relation to controlling the cooking apparatus 100 through the display 320 using a touch.

On the other hand, when the knob 200 is attached to the display 320, as shown in FIGS. 17A and 17B, the cooking apparatus 100 may be controlled by using the knob 200.

That is, as shown in FIG. 17A, the user may input a heating temperature and a heating time of the heating portion 600 to be controlled, by using the knob 200 attached to the display 320.

Also, when the user attaches the knob 200 to an area of the display 320, the controller 400 may recognize the attachment and may change a screen of the display 320 to a screen controllable by using the knob 200 to allow the user to more easily control the cooking apparatus 1.

That is, when the user attaches the knob 200 to the display 320, the controller 400 may recognize the attachment and may control the screen of the display 320 as shown in FIG. 17B. In this case, since the screen of the display 320 is changed according to a control method using the knob 200, there is an advantage of allowing the user to easily control the cooking apparatus 100.

Hitherto, the features and effects of the present invention have been described in detail.

In the case of a cooking apparatus using a general induction heating apparatus, an analog button with a covered top to remain in an integrated body or a touch method of controlling through a touch of a user is used. However, the above-described limited input method do not satisfy various users' desires with respect to a design and operation method of a cooking apparatus and there is a limitation of being unfamiliar to users who are familiar with using of a dialing type handle, that is, a knob.

However, in the case of the cooking apparatus according to the embodiments, since the cooking apparatus is controlled by using a detachable knob, a user may control the cooking apparatus according to his or her preference. Also, since the cooking apparatus may be controlled by attaching the knob to several surfaces of a body of the cooking apparatus not a limited space, the user may more conveniently control the cooking apparatus.

As is apparent from the above description, the cooking apparatus may be controlled according to a user's preferences by using the knob attachable to or detachable from the body of the cooking apparatus and may be more conveniently controlled by using the knob in several sides of the cooking apparatus not a limited space.

Although a few embodiments have been shown and described, it should be appreciated by one of ordinary skill in the art that changes may be made in these embodiments. For example, even when the described technologies are performed in an order different from the above-described method and/or the described systems, structures, and components such as devices, circuits and the like are combined in different forms from the described method or replaced or substituted with other components or equivalents thereof, an adequate result may be achieved. Therefore, other implements, other embodiments, and equivalents of the claims will be within the scope of the following claims.

What is claimed is:

1. A cooking apparatus comprising:
a body;
an input unit configured to receive a command for controlling the cooking apparatus from a user;
a knob configured to be attachable or detachable to one surface of the body and operate the input unit when the knob is attached to the one surface of the body; and
a controller configured to:
determine whether the knob is attached to the body;
receive the command from the knob when the knob is determined to be attached to the body; and
receive the command from the input unit when the knob is determined not to be attached to the body,
wherein the knob further comprises a protrusion configured to protrude toward the body,
wherein the protrusion comprises a conductive material,
wherein the input unit comprises a plurality of touch sensors arranged in a circular shape, and
wherein the controller is configured to determine that the knob is attached to the body when more than one of the plurality of touch sensors sense the protrusion.

2. The cooking apparatus of claim 1, further comprising a display configured to display information of the cooking apparatus,
wherein the knob is attachable to or detachable from at least one of the input unit and the display.

3. The cooking apparatus of claim 2, wherein the controller controls at least one of screens of the input unit and the display depending on whether the knob is determined to be attached to the display.

4. The cooking apparatus of claim 1, further comprising at least one heating portion configured to produce heat,
wherein the command comprises at least one of a temperature and a heating time of the heating portion.

5. The cooking apparatus of claim 4, wherein the controller controls the at least one of the temperature and the heating time for the heating portion based on the command.

6. The cooking apparatus of claim 4, wherein the controller controls the input unit to allow the user to sequentially change or to directly input and change the at least one of the temperature and the heating time of the heating portion when the knob is determined to be detached from the body.

7. The cooking apparatus of claim 4, wherein the controller senses rotation of the knob and relatively changes the at least one of the temperature and the heating time of the heating portion by a rotational amount of the knob.

8. The cooking apparatus of claim 1, wherein the knob further comprises a first magnetic body and the body further comprises a second magnetic body, and
wherein the knob and the body are attached to each other through a magnetic attraction between the first magnetic body and the second magnetic body.

9. The cooking apparatus of claim 4, wherein the knob further comprises a selector configured to select the at least one heating portion to be controlled.

10. The cooking apparatus of claim 9, wherein the knob further comprises an indicator configured to indicate the selected at least one heating portion.

11. The cooking apparatus of claim 2, wherein the display further comprises a touch film and a display panel.

12. The cooking apparatus of claim 11, wherein the controller senses whether the knob is attached to the body, based on an area of the touch film sensing the protrusion.

13. The cooking apparatus of claim 11, wherein the knob further comprises a first magnetic body and the display panel further comprises a second magnetic body, and
wherein the knob and the display panel are attached to each other through a magnetic attraction between the first magnetic body and the second magnetic body.

14. A method of controlling the cooking apparatus of claim 1, the method comprising:
determining whether the knob is attached to the body; and
receiving a command for the cooking apparatus from the knob when the knob is determined to be attached to the body and receiving the command from the input unit when the knob is determined not to be attached to the body.

15. The method of claim 14, wherein the cooking apparatus further comprise a display,
wherein the knob is attachable to or detachable from at least one of the input unit and the display.

16. The method of claim 15, wherein the controlling comprises controlling at least one of screens of the display and the input unit depending on whether the knob is determined to be attached to the display.

17. The method of claim 14, wherein the command comprises at least one of a heating temperature and a heating time for the cooking apparatus.

* * * * *